US008859151B2

(12) United States Patent
Minteer et al.

(10) Patent No.: US 8,859,151 B2
(45) Date of Patent: Oct. 14, 2014

(54) IMMOBILIZED ENZYMES IN BIOCATHODES

(75) Inventors: Shelley D. Minteer, Pacific, MO (US); Sabina Topcagic, St. Louis, MO (US); Becky Treu, St. Peters, MO (US)

(73) Assignee: St. Louis University, St. Louis, MO (US)

( * ) Notice: Subject to any disclaimer, the term of this patent is extended or adjusted under 35 U.S.C. 154(b) by 736 days.

(21) Appl. No.: 10/931,147

(22) Filed: Aug. 31, 2004

(65) Prior Publication Data

US 2005/0095466 A1 May 5, 2005

Related U.S. Application Data

(60) Provisional application No. 60/517,626, filed on Nov. 5, 2003.

(51) Int. Cl.
*H01M 8/16* (2006.01)
*C12N 11/00* (2006.01)
*C12N 11/04* (2006.01)
*H01M 4/86* (2006.01)
*B82Y 30/00* (2011.01)

(52) U.S. Cl.
CPC ............... *B82Y 30/00* (2013.01); *Y02E 60/527* (2013.01); *H01M 8/16* (2013.01); *H01M 4/8605* (2013.01)
USPC ........................... 429/401; 435/174; 435/182

(58) Field of Classification Search
USPC ..................................................... 204/403.04
See application file for complete search history.

(56) References Cited

U.S. PATENT DOCUMENTS

| 4,117,202 A | 9/1978 | Beck |
| 4,207,076 A | 6/1980 | Bove et al. |
| 4,224,125 A | 9/1980 | Nakamura et al. |
| 4,490,464 A | 12/1984 | Gorton et al. |
| 4,705,503 A | 11/1987 | Dorman et al. |
| 4,761,209 A | 8/1988 | Bonaventura et al. |
| 5,211,984 A * | 5/1993 | Wilson ........................... 427/115 |
| 5,262,035 A | 11/1993 | Gregg et al. |
| 5,262,305 A | 11/1993 | Heller et al. |
| 5,264,092 A | 11/1993 | Skotheim et al. |
| 5,264,105 A * | 11/1993 | Gregg et al. ............. 204/403.09 |
| 5,320,725 A | 6/1994 | Gregg et al. |
| 5,356,786 A | 10/1994 | Heller et al. |
| 5,393,615 A | 2/1995 | Corey et al. |
| 5,521,101 A * | 5/1996 | Saini et al. .................. 205/777.5 |
| 5,593,852 A | 1/1997 | Heller et al. |
| 5,665,222 A | 9/1997 | Heller et al. |
| 5,718,947 A | 2/1998 | Martin et al. |
| 5,820,551 A | 10/1998 | Hill et al. |
| 5,919,583 A * | 7/1999 | Grot et al. ....................... 429/33 |
| 5,958,199 A * | 9/1999 | Miyamoto et al. ........ 204/403.14 |
| 6,294,281 B1 | 9/2001 | Heller |
| 6,294,291 B1 | 9/2001 | Ozaki et al. |
| 6,387,625 B1 * | 5/2002 | Eckhardt et al. .................. 435/6 |
| 6,460,733 B2 | 10/2002 | Acker et al. |
| 6,500,571 B2 | 12/2002 | Liberatore et al. |
| 6,531,239 B2 | 3/2003 | Heller |
| 2002/0025456 A1 | 2/2002 | Gieshoff et al. |
| 2002/0025469 A1 * | 2/2002 | Heller ............................ 429/43 |
| 2002/0127440 A1 * | 9/2002 | Yamamoto et al. ............... 429/2 |
| 2003/0027023 A1 | 2/2003 | Dutil et al. |
| 2003/0039868 A1 | 2/2003 | Liberatore et al. |
| 2003/0087144 A1 | 5/2003 | Sun et al. |
| 2003/0148169 A1 | 8/2003 | Willner et al. |
| 2003/0164335 A1 | 9/2003 | Grate et al. |
| 2003/0198858 A1 | 10/2003 | Sun et al. |
| 2004/0101741 A1 | 5/2004 | Minteer et al. |
| 2004/0121018 A1 | 6/2004 | Grate et al. |
| 2004/0214053 A1 | 10/2004 | Armstrong |
| 2004/0217016 A1 * | 11/2004 | Khan ........................ 205/777.5 |
| 2005/0101841 A9 | 5/2005 | Kaylor et al. |

FOREIGN PATENT DOCUMENTS

| EP | 0300082 A2 | 1/1989 | | |
| EP | 0 667 397 A1 | 8/1995 | | |
| EP | 0 747 984 A2 | 12/1996 | | |
| WO | WO 90/05910 | * 5/1990 | ............ | G01N 27/26 |
| WO | WO 99/38003 | * 7/1999 | ............ | G01N 27/26 |
| WO | WO 00/22688 A3 | 4/2000 | | |
| WO | 03/006713 A1 | 1/2003 | | |
| WO | 03/019170 A1 | 3/2003 | | |
| WO | 03106966 A2 | 12/2003 | | |
| WO | 2004079848 A2 | 9/2004 | | |

OTHER PUBLICATIONS

Glucose Oxidase Pathway obtained from "http://www.biochemj.org/bj/347/0553/bj3470553f03.gif" accessed Mar. 12, 2008.*
Advanced Enzymes "Glucose Oxidase, Enzyme, Glucose oxidase test, Glucose oxidase reaction, Glucose oxidase method, Glucose oxidase assay" accessd Mar. 12, 2008 at http://www.enzymeindia.com/enzymes/glucose-oxidase.asp.*
M. D. Gouda, M. S. Thakur, and N. G. Karanth "Stability Studies on Immobilized Glucose Oxidase Using an Amperometric Biosensor ± Effect of Protein Based Stabilizing Agents" Electroanalysis 2001, 13, No. 10, 849-855.*
Schindler et al. "Long Functioning beta-D-glucose and L-lactate biosensors ,for continuous flow-through measurements for fouling-resistant and selectivity-optimized serum-and haemoanalysis" European Journal of Clinical Chemistry and Clinical Biochemistry Aug. 1994;32(8):599-608—25 page translation provided.*
Ekaterina S. Ryabova, et al "Coordinative Approach to Mediated Electron Transfer: Ruthenium Complexed to Native Glucose Oxidase" Angew. Chem. Int. Ed. 1999, 38, No. 6 p. 804-805.*

(Continued)

*Primary Examiner* — Thane Underdahl
(74) *Attorney, Agent, or Firm* — Senniger Powers LLP

(57) ABSTRACT

Disclosed is an improved biofuel cell having a cathode comprising a dual function membrane, which contains an oxygen oxidoreductase enzyme immobilized within a buffered compartment of the membrane and an electron transport mediator which transfers electrons from an electron conducting electrode to the redox reaction catalyzed by the oxygen oxidoreductase enzyme. The improved biofuel cell also has an anode that contains an oxidoreductase enzyme that uses an organic fuel, such as alcohol, as a substrate. An electric current can flow between the anode and the cathode.

64 Claims, 14 Drawing Sheets

(56) References Cited

OTHER PUBLICATIONS

Bromberg et al. "Novel approaches in biosensors and rapid diagnostic assays" Kluwer Academic Press 2001, p. 116.*

Francis Trudeau et al. "Reagentless Mediated Laccase Electrode for the Detection of Enzyme Modulators" Anal. Chem. 1997, 69, 882-886.*

Mano et al. "An Oxygen Cathode Operating in a Physiological Solution" J. Am. Chem. Soc. 2002, 124, 6480-6486, Published on Web May 10, 2002.*

Nelson Durán et al. "Applications of laccases and tyrosinases (phenoloxidases) immobilized on different supports: a review" Enzyme and Microbial Technology 31 (2002) 907-931, Available Online Oct. 1, 2002.*

Fernandez-Sanchez et al. "Voltammetric monitoring of laccase-catalysed mediated reactions" Bioelectrochemistry 58 (2002) 149-156, Available Online Aug. 12, 2002.*

Buttry et al. "Electrochemical Control of the Luminescent Lifetime of $Ru(bpy)_3^{2+*}$ Incorporated in Nafion Films on Graphite Electrodes" JACS 1982, 104, 4824-4829.*

Guillen et al. "Oxygen Activation during Oxidation of Methoxyhydroquinones by Laccase from *Pleurotus eryngii*" Applied and Environmental Microbiology, Jan. 2000 p. 170-175.*

Zhang et al. "Evaluation of substituted-1,10-phenanthroline complexes of osmium as mediator for glucose oxidase of *Aspergillus niger*" Analytica Chimica Acta 408 (2000) 225-232.*

Daigle et al. "Mediated reagentless enzyme inhibition electrodes" Biosensors & Bioelectronics vol. 13. No. 3-4, pp. 417-425, 1998.*

Teoh et al. "Micelle-like macrovoids in mixed matrix PVDF-PTFE hollow fiber membranes" Journal of Membrane Science 338 (2009) 5-10.*

Mauritz et al. "State of Understanding of Nafion" Chem. Rev. 2004, 104, 4535-4585.*

Kitamura et al. "Formation Mechanism of Porous Structure in Polytetrafluoroethylene (PTFE) Porous Membrane Through Mechanical Operations" Polymer Engineering and Science; Nov. 1999; 39, 11; p. 2256-2263.*

Worthington et al. "Alcohol Dehydrogenase," Worthington Enzyme Manual (1988) 16, pp. 1-22, http://www.worthington-biochem.com/ADH/default.html.

Davis et al. "Bioelectrochemical Fuel-Cell and Sensor Based on a Quinoprotein, Alcohol-Dehydrogenase," *Enzyme and Microbial Technology* 5 (1983) 383-388.

Thomas et al. "Effects of Annealing on Mixture-Cast Membranes of Nafion® and Quaternary Ammonium Bromide-Salts," *Journal of Membrane Science*, vol. 213, (2003) 55-66.

Schrenk et al. "Effect of Mixture Casting Nafione® with Quatemary Ammonium Bromide Salts on the Ion-Exchange Capacity and Mass Transport in the Membranes," *Journal of Membrane Science* 205 (2002) 3-10.

Zhou et al. "The Electrochemical Polymerization of Methylene Green and its Electrocatalysis for the Oxidation of NADH,"*Analytica Chimica Acta* 329 (1996) 41-48.

Yue et al. "Enzymatic Oxidation of C1 Compounds in a Biochemical Fuel Cell," *Chemical Engineering Journal*, 33B (1986) B69-B77.

Frebortova et al. "Intramolecular electron transport in guinoprotein alcohol dehydrogenase of *Acetobacter methanolicus*: a redox-titration study" Biochemica et Biophysica Acta, vol. 1363 (1998) 24-34.

Green et al. "Inversion of the Substrate Specificity of Yeast Alcohol Dehydrogenase," *Journal of Biological Chemistry* 268 (1993) 7792-7798.

Plotkin et al. "Methanol Dehydrogenase Bioelectrochemical Cell and Alcohol Detector," *Biotechnology Letters*, vol. 3, No. 4 (1981) 187-192.

Palmore et al. "A Methanol/Dioxygen Biofuel Cell that Uses NAD+-Dependent Dehydrogenases as Catalysts: Application of an Electro-Enzymic Method to Regenerate Nicotinamide Adenine Dinucleotide at Low Overpotentials," *Journal of Electroanalytical Chemistry* 443 (1998) 155-161.

Tayhas et al. "Microbial and Enzymatic Biofuel Cells," in ACS Symposium Series 566 (1994) 271-290.

Chen et al. "A Miniature Biofuel Cell" J. Am. Chem. Soc., vol. 123 (2001) pp. 8630-8631.

Blaedel et al. "Study of the Electrochemical Oxidation of Reduced Nicotinamide Adenine Dinucleotide," *Analytical Chemistry* 47 (1975) 1337-1338.

Kim et al., "A Miniature Membrane-less Biofuel Cell Operating Under Physiological Conditions at 0.5 V" Journal of the Electrochemical Society, 150(2):A209-A213 (2003).

Leonida et al., "Co-Electropolymerization of a Viologen Oligomer and Lipoamide Dehydrogenase on an Electrode Surface. Application to Cofactor Regeneration" Bioorganic & Medicinal Chemistry Letters, 6(14):1663-1666 (1996).

International Search Report for analogous application No. PCT/US2004/037151 dated Sep. 20, 2006.

Office action in U.S. Appl. No. 10/617,452, dated Oct. 10, 2006.

Response to Office action in U.S. Appl. No. 10/617,452, dated Oct. 10, 2006, filed Jan. 10, 2007.

Office action in U.S. Appl. No. 10/617,452, dated Apr. 3, 2007.

Response to Office action in U.S. Appl. No. 10/617,452, dated Apr. 3, 2007, filed Jun. 28, 2007.

Ohara, T. et al., "Wired" Enzyme Electrodes for Amperometric Determination of Glucose or Lactate in the Presence of Interfering Substances, Analytical Chemistry, Vo. 66, No. 15, Aug. 1, 1994, pp. 2451-2457, American Chemical Society.

Yamada, Y., et al., "Effective Bioconversion with Continuous Product Recovery Using AOT/Lecithin Mixed Reverse Micellar Systems and Centrifugal Partition Chromatography as a Novel Bioreactor," Biotechnol. Prog., 1995, pp. 682-688, vol. 11, No. 6.

Yoshioka, H., et al., "Chitosan-Derived Polymer-Surfactants and Their Micellar Properties," Abstract, Biosci. Biotechnol. Biochem., Oct. 1995, pp. 1901-1904, vol. 59, No. 10.

* cited by examiner

IMMOBILIZED ENZYMES IN BIOCATHODES

REFERENCE TO RELATED APPLICATIONS

This application claims priority from U.S. provisional application Ser. No. 60/517,626 filed on Nov. 5, 2003, which is incorporated herein by reference in its entirety.

GOVERNMENT SUPPORT

This work was supported in part by a grant from the Office of Naval Research (Grant No. N00014-03-0222). The United States Government has certain rights in this invention.

BACKGROUND OF THE INVENTION

1. Field of the Invention

The present invention is directed in general to biological enzyme-based fuel cells (a.k.a. biofuel cells) and their methods of manufacture and use. More specifically, the invention is directed to biocathodes and their method of manufacture and use.

2. Description of Related Art

References cited throughout this specification are incorporated herein by reference. The discussion of those references is intended merely to summarize the assertions made by their authors and no admission is made that any reference constitutes prior art. Applicants reserve the right to challenge the accuracy and pertinence of the cited references.

A biofuel cell is an electrochemical device in which energy derived from chemical reactions is converted to electrical energy by means of the catalytic activity of living cells and/or their enzymes. Biofuel cells generally use complex molecules to generate at the anode the hydrogen ions required to reduce oxygen to water, while generating free electrons for use in electrical applications. A biocathode is the electrode of the biofuel cell where electrons and protons from the anode are used by the catalyst to reduce oxygen to water. A biofuel cell is similar to a traditional polymer electrolyte membrane ("PEM") fuel cell in that it consists of a cathode and anode separated by some sort of barrier or salt bridge, such as for example a polymer electrolyte membrane. Biofuel cells differ from the traditional fuel cell by the material used to catalyze the electrochemical reaction. Rather than using precious metals as catalysts, biofuel cells rely on biological molecules such as enzymes to carry out the reaction. Although early biofuel cell technology employed metabolic pathways of whole microorganisms, the problems associated with this approach include low volumetric catalytic activity of the whole organism and impractical power density outputs [Palmore and Whitesides, 1994, ACS Symposium Series 566: 271-290]. Enzyme isolation techniques spurred advancement in biofuel cell applications by increasing volumetric activity and catalytic capacity [Palmore and Whitesides, 1994, ACS Symposium Series 566:271-290]. Isolated enzyme biofuel cells yield increased power density output by overcoming interferences associated with cellular membrane impedance with electron transfer and lack of fuel consuming microbial growth.

Although enzymes are highly efficient catalysts, there have been problems incorporating them into fuel cells. Early enzyme-based fuel cells contained enzymes in solution rather than immobilized on the electrode surface [Palmore and Whitesides, 1994, ACS Symposium Series 566:271-290 and references within, which are incorporated herein by reference]. Enzymes in solutions are only stable for days, whereas immobilized enzymes can be stable for months. One of the main obstacles of enzyme-based biofuel cells has been to immobilize the enzyme in a membrane at the electrode surface that will extend the lifetime of the enzyme and form a mechanically and chemically stable layer, while not forming a capacitive region at the electrode surface. In most $H_2/O_2$ fuel cells, the binder that holds the catalyst at the electrode surface is Nafion®. Nafion® is a perfluorinated ion exchange polymer that has excellent properties as an ion conductor. However, Nafion® has not been successful at immobilizing enzymes at the surface of biofuel cell electrodes because Nafion® forms an acidic membrane that decreases the lifetime and activity of the enzyme.

Several attempts have been made by others to develop biofuel cells that incorporate immobilized enzymes. Various methods of immobilizing enzymes for use in biological fuel cells, wherein the enzymes show at least, minimal activity and stability are described in U.S. Pat. No. 6,294,291, U.S. Pat. No. 6,531,239 and Chen et al., J. Am. Chem. Soc. 2001, vol. 123:8630-8631, which are incorporated herein by reference. Those references describe the immobilization of various redox enzymes (oxidoreductases) onto polymer sol gel matrices, which also incorporate electron transfer mediators, such as osmium, cobalt or ruthenium complexes. However, it is important to note that the enzymes are immobilized only at the surface of the sol gel (i.e., two dimensional), which is not buffered. Thus, the enzymes described in those disclosures have very limited stability, with a maximum activity lifetime of generally no more than 7 to 10 days.

Minteer et al. developed a biofuel cell, which includes an improved bioanode (disclosed in patent applications 60/429, 829, 60/486,076 and Ser. No. 10/617,452), with an active life span of greater than 45 days with no degradation in performance. A particular embodiment of that biofuel cell used dehydrogenase enzymes and $^{NAD+}$ as the anode catalyst and ethanol as the anode fuel, and an ELAT electrode comprising about 20% Pt on Vulcan XC-72 (E-Tek) as the cathode catalyst and dissolved O2 as the cathode fuel. The open circuit potential of that biofuel cell was 0.82 V at 20° C. and pH 7.15, and the maximum power density was 2.04 mW/cm$^2$.

The improved bioanode includes a quaternary ammonium bromide salt-treated (modified) Nafion® membrane, which provides an ideal environment for stable enzyme immobilization. The modified Nafion® membrane, while retaining the electrical properties of unmodified Nafion®, was shown previously to have increased mass transport capacity for ions and neutral species, a lower acidity and a buffered near neutral pH than unmodified Nafion®, and an increased pore size to accommodate the immobilization of relatively large molecules such as enzymes (see Schrenk et al., 2002, J. Membr. Sci. 205:3-10, which is incorporated herein by reference).

Other biocathodes, which are less stable, less efficient and more toxic than the particular embodiment of the biocathode that is disclosed in this application, have been described in the literature (e.g., Chen et al., 2001). For example, the biocathode of Chen et al. utilizes a hydrogel membrane, which is not buffered and is only able to bind enzymes at the surface, the cathode enzyme laccase (EC 1.10.3.2), which has a pH optimum of 5 and is inactive in the presence of chloride ions, and an osmium complex as an electron transport mediator, which is toxic. There is a need for an improved biocathode including a cathode enzyme, which is not affected by chloride ions, a less toxic electron transport mediator, and a modified ion exchange membrane that incorporates the cathode enzyme within a buffered micelle.

SUMMARY OF THE INVENTION

Among the various aspects of the present invention is a biocathode comprising (a) an electron conductor; (b) at least one enzyme capable of reacting with a reduced form of the electron mediator and an oxidant to produce an oxidized form of the electron mediator and water; and (c) an enzyme immobilization material comprising an electrocatalyst, the enzyme immobilization material being capable of immobilizing and stabilizing the enzyme, the material being permeable to the oxidant, an oxidized form of the electrocatalyst being capable of gaining electrons from the electron conductor to produce a reduced form of the electrocatalyst that is capable of reacting with an oxidized form of the electron mediator to produce a reduced form of the electron mediator and an oxidized form of the electrocatalyst; wherein the electrocatalyst is present in a concentration sufficient to make the enzyme immobilization material conduct electrons.

Still another aspect of the present invention is a biocathode comprising (a) an electron conductor; (b) at least one enzyme capable of reacting with a reduced form of an electron mediator and an oxidant to produce an oxidized form of the electron mediator and water; and (c) an enzyme immobilization material comprising the electron mediator, the enzyme immobilization material being capable of immobilizing and stabilizing the enzyme, the material being permeable to the oxidant, an oxidized form of the electron mediator being capable of gaining electrons from the electron conductor to produce a reduced form of the electron mediator; wherein the electron conductor is present in a concentration sufficient to make the enzyme immobilization material conduct electrons.

A further aspect of the present invention is a biocathode comprising (a) an electron conductor; (b) at least one enzyme capable of reacting with a reduced form of an electron mediator and an oxidant to produce an oxidized form of the electron mediator and water; and (c) an enzyme immobilization material comprising the electron mediator and an electrocatalyst, the enzyme immobilization material being capable of immobilizing and stabilizing the enzyme, the material being permeable to the oxidant, an oxidized form of the electrocatalyst being capable of gaining electrons from the electron conductor to produce a reduced form of the electrocatalyst that is capable of reacting with an oxidized form of the electron mediator to produce a reduced form of the electron mediator and an oxidized form of the electrocatalyst; wherein the electrocatalyst is present in a concentration sufficient to make the enzyme immobilization material conduct electrons.

Another aspect of the present invention is a biocathode comprising (a) an electron conductor; (b) at least one enzyme capable of reacting with a reduced form of an electron mediator and an oxidant to produce an oxidized form of the electron mediator and water; and (c) an enzyme immobilization material comprising the electron mediator, the enzyme immobilization material being capable of immobilizing and stabilizing the enzyme, the material being permeable to the oxidant, an oxidized form of an electrocatalyst being capable of gaining electrons from the electron conductor to produce a reduced form of the electrocatalyst that is capable of reacting with an oxidized form of the electron mediator to produce a reduced form of the electron mediator and an oxidized form of the electrocatalyst; wherein the electrocatalyst is present in a concentration sufficient to make the enzyme immobilization material conduct electrons.

Yet another aspect of the present invention is a biofuel cell for generating electricity comprising a fuel fluid, an electron mediator, an anode capable of a reaction to oxidize the fuel fluid, and a biocathode comprising (a) an electron conductor; (b) at least one enzyme capable of reacting with a reduced form of the electron mediator and an oxidant to produce an oxidized form of the electron mediator and water; and (c) an enzyme immobilization material comprising an electrocatalyst, the enzyme immobilization material being capable of immobilizing and stabilizing the enzyme, the material being permeable to the oxidant, an oxidized form of the electrocatalyst being capable of gaining electrons from the electron conductor to produce a reduced form of the electrocatalyst that is capable of reacting with an oxidized form of the electron mediator to produce a reduced form of the electron mediator and an oxidized form of the electrocatalyst; wherein the electrocatalyst is present in a concentration sufficient to make the enzyme immobilization material conduct electrons.

Another aspect of the present invention is a biofuel cell for generating electricity comprising a fuel fluid, an anode capable of a reaction to oxidize the fuel fluid, and a biocathode comprising (a) an electron conductor; (b) at least one enzyme capable of reacting with a reduced form of an electron mediator and an oxidant to produce an oxidized form of the electron mediator and water; and (c) an enzyme immobilization material comprising the electron mediator, the enzyme immobilization material being capable of immobilizing and stabilizing the enzyme, the material being permeable to the oxidant, an oxidized form of the electron mediator being capable of gaining electrons from the electron conductor to produce a reduced form of the electron mediator; wherein the electron mediator is present in a concentration sufficient to make the enzyme immobilization material conduct electrons.

A further aspect of the present invention is a biofuel cell for generating electricity comprising a fuel fluid, an anode capable of a reaction to oxidize the fuel fluid, and a biocathode comprising (a) an electron conductor; (b) at least one enzyme capable of reacting with a reduced form of an electron mediator and an oxidant to produce an oxidized form of the electron mediator and water; and (c) an enzyme immobilization material comprising the electron mediator and an electrocatalyst, the enzyme immobilization material being capable of immobilizing and stabilizing the enzyme, the material being permeable to the oxidant, an oxidized form of the electrocatalyst being capable of gaining electrons from the electron conductor to produce a reduced form of the electrocatalyst that is capable of reacting with an oxidized form of the electron mediator to produce a reduced form of the electron mediator and an oxidized form of the electrocatalyst; wherein the electrocatalyst is present in a concentration sufficient to make the enzyme immobilization material conduct electrons.

Yet a further aspect of the present invention is a biofuel cell for generating electricity comprising a fuel fluid, an anode capable of a reaction to oxidize the fuel fluid, and a biocathode comprising (a) an electron conductor; (b) at least one enzyme capable of reacting with a reduced form of an electron mediator and an oxidant to produce an oxidized form of the electron mediator and water; and (c) an enzyme immobilization material comprising the electron mediator, the enzyme immobilization material being capable of immobilizing and stabilizing the enzyme, the material being permeable to the oxidant, an oxidized form of an electrocatalyst being capable of gaining electrons from the electron conductor to produce a reduced form of the electrocatalyst that is capable of reacting with an oxidized form of the electron mediator to produce a reduced form of the electron mediator and an oxidized form of the electrocatalyst; wherein the electron mediator is present in a concentration sufficient to make the enzyme immobilization material conduct electrons.

The present invention is further directed to a method of generating electricity using a biofuel cell described above comprising (a) oxidizing the fuel fluid at the anode and reducing the oxidant at the biocathode; (b) oxidizing the reduced form of the electron mediator during the reduction of the oxidant at the biocathode; (c) oxidizing the electrocatalyst; and (d) reducing the electrocatalyst at the electron conductor.

The present invention is still further directed to a method of generating electricity using a biofuel cell described above comprising (a) oxidizing the fuel fluid at the anode and reducing the oxidant at the biocathode; (b) oxidizing the reduced form of the electron mediator during the reduction of the oxidant at the biocathode; and (c) reducing the electron mediator at the electron conductor.

Another aspect of the present invention is a fuel cell comprising a cathode and an anode, wherein the cathode comprises an electron conductor, a cathode enzyme, an electron transport mediator, and a membrane, wherein the cathode enzyme is immobilized within a buffered internal compartment of the membrane.

A further aspect of the present invention is a method of generating electrical power, comprising (a) oxidizing an organic fuel at an anode in the presence of at least one anode oxidoreductase enzyme, which is incorporated in the anode, (b) transferring electrons from an oxidized organic fuel to an anode electron conducting material by way of a redox polymer, (c) reducing an oxygen molecule at a cathode in the presence of an oxygen oxidoreductase enzyme, which is immobilized in a buffered compartment of a modified cathode ion exchange polymer membrane, and (d) transferring electrons from an electron conducting material to a substrate of the oxygen oxidoreductase by way of an electron transport mediator, which is immobilized in a buffered compartment of a modified ion exchange polymer membrane, such that an electric current is produced.

Yet another aspect of the present invention is a biocathode useful in the acceptance of electrons from an electrical circuit, which comprises an electron conducting material juxtaposed to a dual use membrane, and a dual use membrane, wherein the dual use membrane comprises a modified ion exchange membrane, an immobilized cathode enzyme, and an electron transport mediator.

Yet another aspect of the present invention is a biocathode useful in the acceptance of electrons from an electrical circuit, which comprises an electron conducting material juxtaposed to a dual use membrane, and a dual use membrane, wherein the dual use membrane comprises a modified ion exchange membrane, an immobilized cathode enzyme, and an electrocatalyst.

The present invention is still further directed to one or more of the previously described biofuel cells, biocathodes, and methods for generating electricity, wherein the enzyme immobilization material comprises a micellar or inverted micellar structure.

The present invention is still further directed to one or more of the previously described biofuel cells, biocathodes, and methods for generating electricity, wherein the enzyme immobilization material comprises a modified perfluoro sulfonic acid-PTFE copolymer.

The present invention is still further directed to one or more of the previously described biofuel cells, biocathodes, and methods for generating electricity, wherein the electron conductor comprises a carbon-based material, a metallic conductor, a semiconductor, a metal oxide or a modified conductor; particularly, a carbon-based material.

The present invention is still further directed to one or more of the previously described biofuel cells, biocathodes, and methods for generating electricity, wherein the electron conductor comprises carbon cloth, carbon paper, carbon screen printed electrodes, carbon black, carbon powder, carbon fiber, single-walled carbon nanotubes, double-walled carbon nanotubes, multi-walled carbon nanotubes, carbon nanotube arrays, diamond-coated conductors, glass carbon, mesoporous carbon, graphite, uncompressed graphite worms, delaminated purified flake graphite, high performance graphite, highly ordered pyrolytic graphite, pyrolytic graphite or polycrystalline graphite.

The present invention is still further directed to one or more of the previously described biofuel cells, biocathodes, and methods for generating electricity, wherein the enzyme immobilization material is modified with a hydrophobic cation larger than $NH_4^+$; preferably, the hydrophobic cation comprises an ammonium-based cation, quaternary ammonium cation, alkyltrimethylammonium cation, organic cation, phosphonium cation, triphenylphosphonium, pyridinium cation, imidazolium cation, hexdecylpyridinium, ethidium, viologen, methyl viologen, benzyl viologen, bis(triphenylphosphine)iminium metal complex, bipyridyl metal complex, phenanthroline-based metal complex, [Ru(bipyridine)$_3$]$^{2+}$ or [Fe(phenanthroline)$_3$]$^{3+}$. In particular, the hydrophobic cation comprises a quaternary ammonium cation represented by formula 1

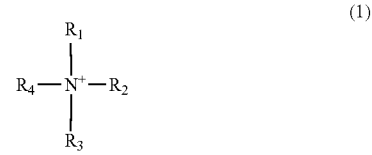

wherein $R_1$, $R_2$, $R_3$ and $R_4$ are independently hydrogen, hydrocarbyl, substituted hydrocarbyl or heterocyclo wherein at least one of $R_1$, $R_2$, $R_3$ and $R_4$ is other than hydrogen. In another embodiment, $R_1$, $R_2$, $R_3$ and $R_4$ are independently hydrogen, methyl, ethyl, propyl, butyl, pentyl, hexyl, heptyl, octyl, nonyl, decyl, undecyl, dodecyl, tridecyl or tetradecyl wherein at least one of $R_1$, $R_2$, $R_3$ and $R_4$ is other than hydrogen. Alternatively, $R_1$, $R_2$, $R_3$ and $R_4$ are the same and are methyl, ethyl, propyl, butyl, pentyl or hexyl. Preferably, the quaternary ammonium cation of formula 1 is tetrabutylammonium, triethylhexylammonium or dodecyltrimethylammonium.

The present invention is still further directed to one or more of the previously described biofuel cells, biocathodes, and methods for generating electricity, wherein the enzyme comprises an oxidoreductase; particularly, a glucose oxidase, alcohol-based oxidase or cholesterol-based oxidase.

The present invention is still further directed to one or more of the previously described biofuel cells, biocathodes, and methods for generating electricity, wherein the enzyme comprises oxygen oxidoreductase having an optimum activity at a pH from about 6.5 to about 7.5; particularly, laccase, cytochrome C oxidase, bilirubin oxidase or peroxidase; more particularly, bilirubin oxidase.

The present invention is still further directed to one or more of the previously described biofuel cells, biocathodes, and methods for generating electricity, wherein the electron mediator comprises a metalloprotein, a conjugated organic compound, a sugar, a sterol, a fatty acid or a coenzyme or substrate of an oxidase; particularly, wherein the oxidized form of the electron mediator comprises stellacyanin, bilirubin, glucose or cholesterol; more particularly, wherein the oxidized form of the electron mediator comprises bilirubin.

The present invention is still further directed to one or more of the previously described biofuel cells, biocathodes, and methods for generating electricity, wherein the electrocatalyst for the electron mediator comprises organometallic cations with standard reduction potentials greater than +0.4 volts; particularly, wherein the electrocatalyst for the electron mediator comprises osmium, ruthenium, iron, nickel, rhodium, rhenium, or cobalt complexes; more particularly, wherein the reduced form of the electrocatalyst for the electron mediator comprises $Ru(phen)_3^{+2}$, $Fe(phen)_3^{+2}$, $Ru(bpy)_3^{+2}$, $Os(bpy)_3^{+2}$ or $Os(terpy)_3^{+2}$.

The present invention is still further directed to one or more of the previously described biofuel cells, biocathodes, and methods for generating electricity, wherein the reduced form of the electrocatalyst for the electron mediator comprises $Ru(bpy)^3_{+2}$.

The present invention is still further directed to one or more of the previously described biofuel cells, biocathodes, and methods for generating electricity, wherein the concentration of the electrocatalyst is from about 100 mM to about 3 M, more preferably from about 250 mM to about 2.25 M, still more preferably from about 500 mM to about 2 M, and most preferably from about 1.0 M to about 1.5 M.

The present invention is still further directed to one or more of the previously described biofuel cells, biocathodes, and methods for generating electricity, wherein the oxidant comprises oxygen or peroxide; particularly, wherein the oxidant comprises oxygen.

The present invention is still further directed to one or more of the previously described biofuel cells, biocathodes, and methods for generating electricity, wherein the fuel fluid comprises ammonia, methanol, ethanol, propanol, isobutanol, butanol and isopropanol, allyl alcohols, aryl alcohols, glycerol, propanediol, mannitol, glucuronate, aldehyde, carbohydrates, glucose, glucose-1, D-glucose, L-glucose, glucose-6-phosphate, lactate, lactate-6-phosphate, D-lactate, L-lactate, fructose, galactose-1, galactose, aldose, sorbose, mannose, glycerate, coenzyme A, acetyl Co-A, malate, isocitrate, formaldehyde, acetaldehyde, acetate, citrate, L-gluconate, beta-hydroxysteroid, alpha-hydroxysteroid, lactaldehyde, testosterone, gluconate, fatty acids, lipids, phosphoglycerate, retinal, estradiol, cyclopentanol, hexadecanol, long-chain alcohols, coniferyl-alcohol, cinnamyl-alcohol, formate, long-chain aldehydes, pyruvate, butanal, acyl-CoA, steroids, amino acids, flavin, NADH, $NADH_2$, NADPH, $NADPH_2$ or hydrogen; particularly, wherein the fuel fluid comprises methanol, ethanol or propanol; more particularly, wherein the fuel fluid comprises ethanol.

The present invention is still further directed to one or more of the previously described biofuel cells, biocathodes, and methods for generating electricity, wherein the modified perfluoro sulfonic acid-PTFE copolymer is modified with tetrabutylammonium bromide.

The present invention is still further directed to one or more of the previously described biofuel cells, and methods for generating electricity, wherein the anode is a bioanode.

DETAILED DESCRIPTION OF THE INVENTION

Figure 1:
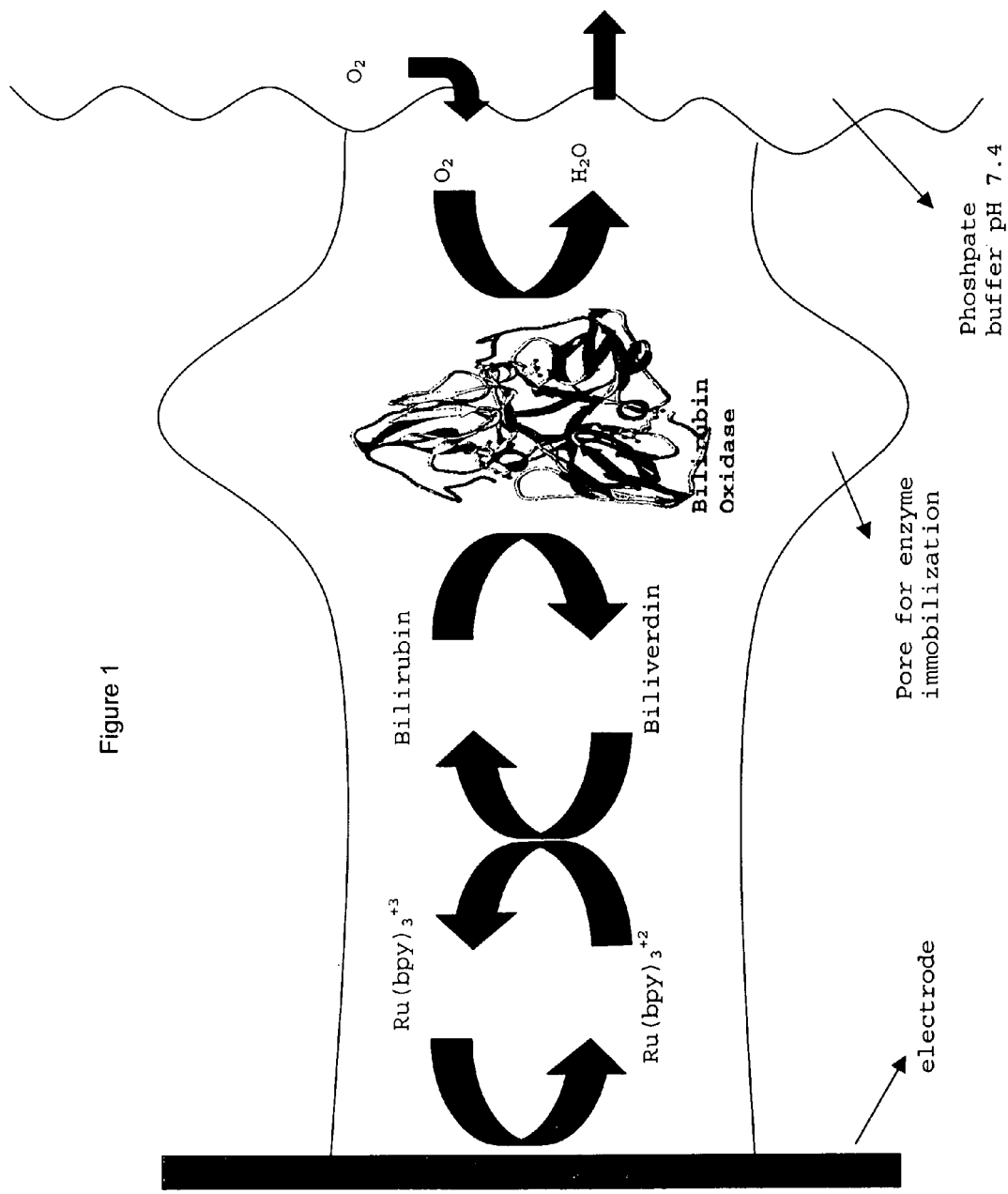
FIG. 1 is a schematic of a dual function biocathode.
Figure 2:
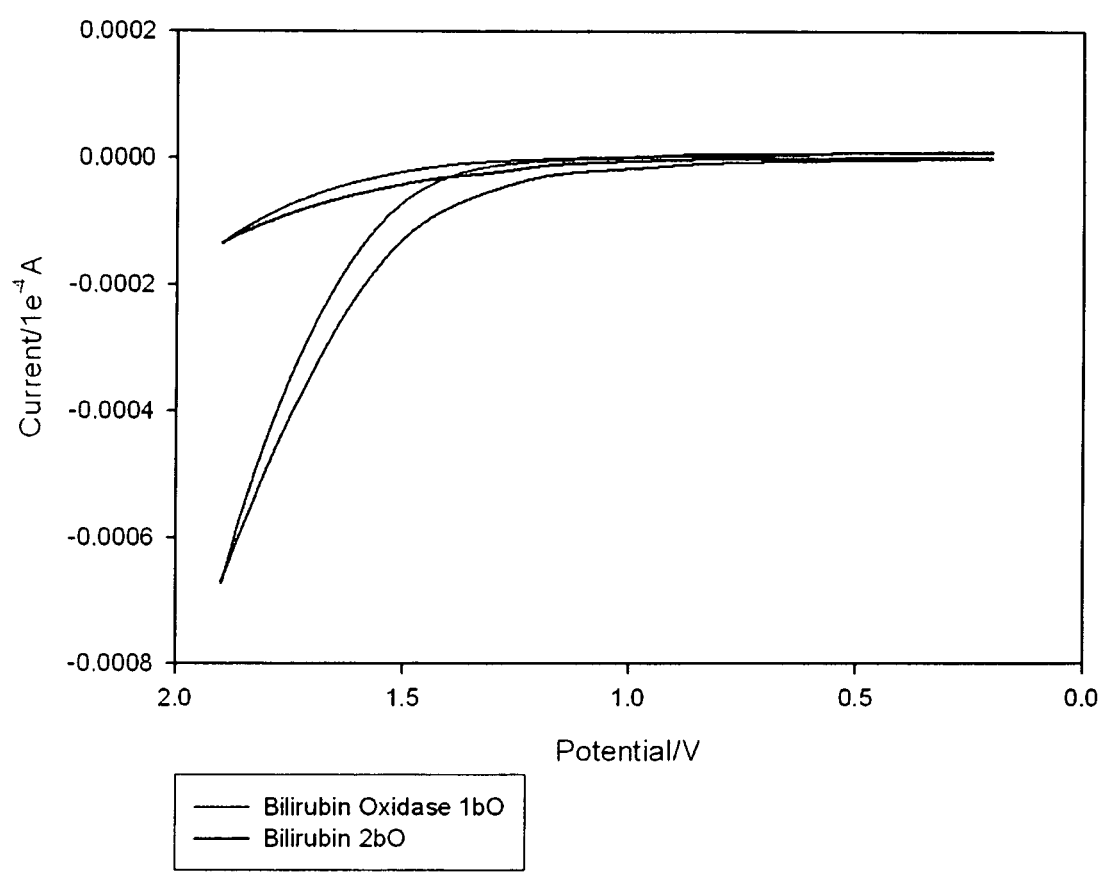
FIG. 2 is a voltammogram showing the best attained current density for a biofuel cell comprising a Nafion I prepared biocathode as described in Example 1.
Figure 3:
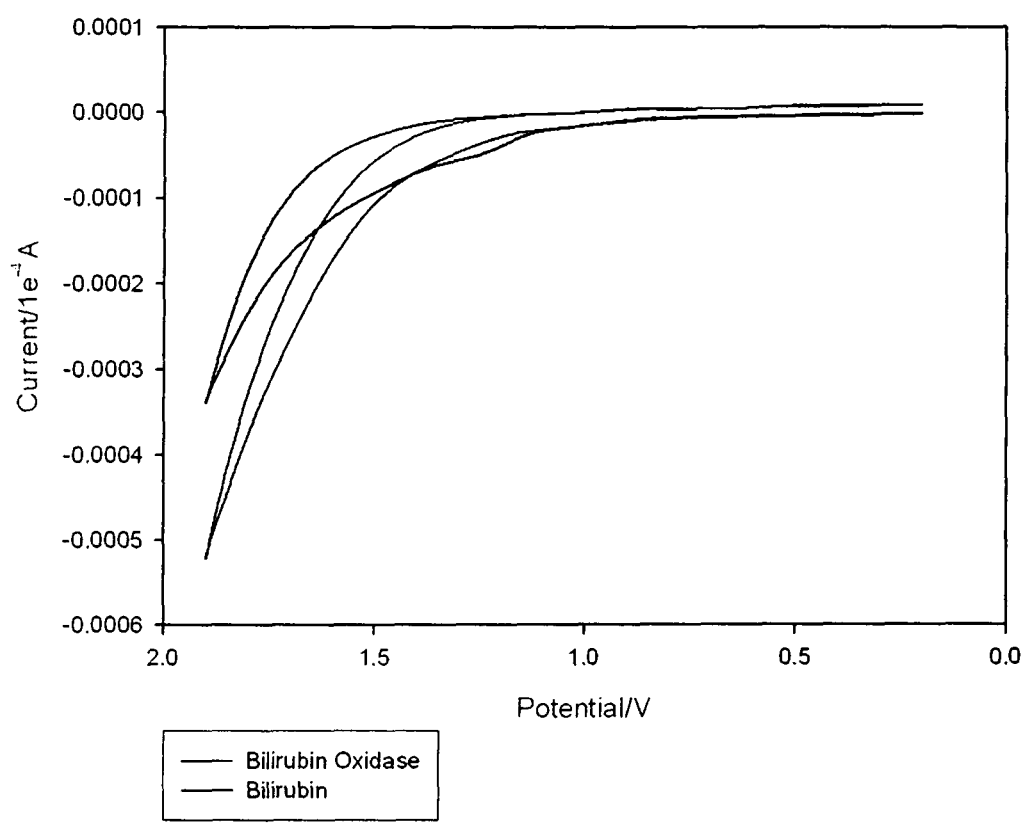
FIG. 3 is a voltammogram showing a middle range current density for a biofuel cell comprising a Nafion I prepared biocathode as described in Example 1.
Figure 4:
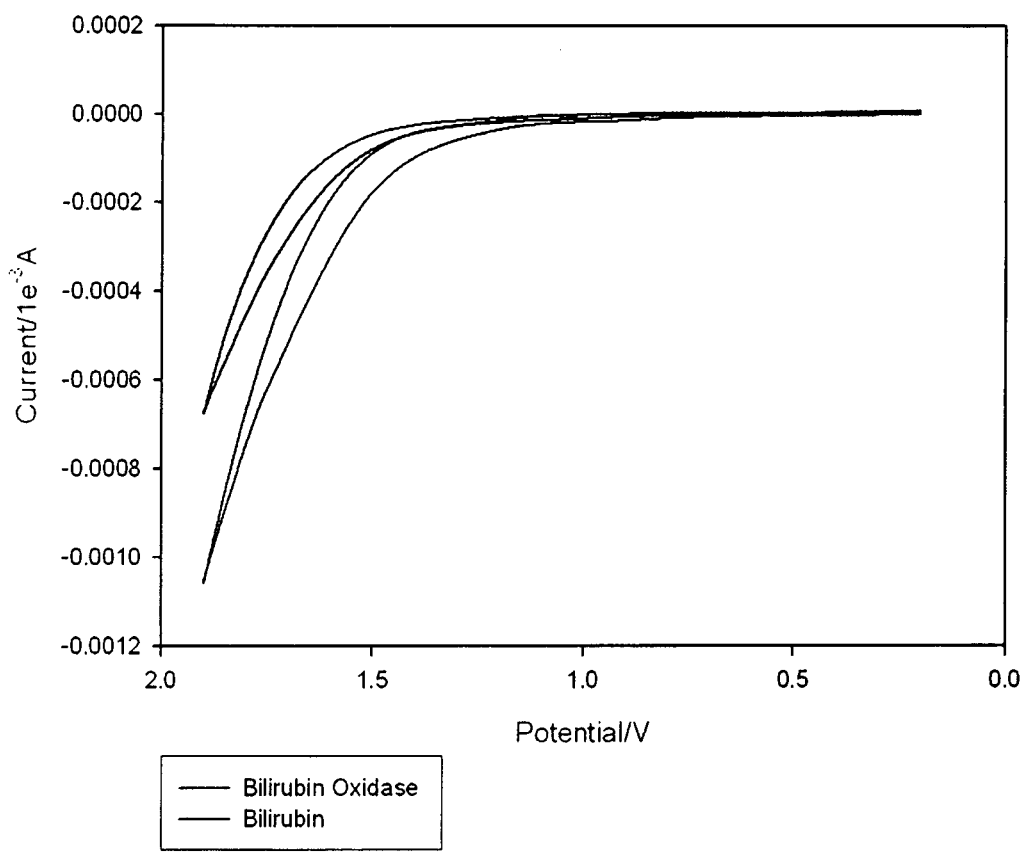
FIG. 4 is a voltammogram showing the worst attained current density for a biofuel cell comprising a Nafion I prepared biocathode as described in Example 1.
Figure 5:
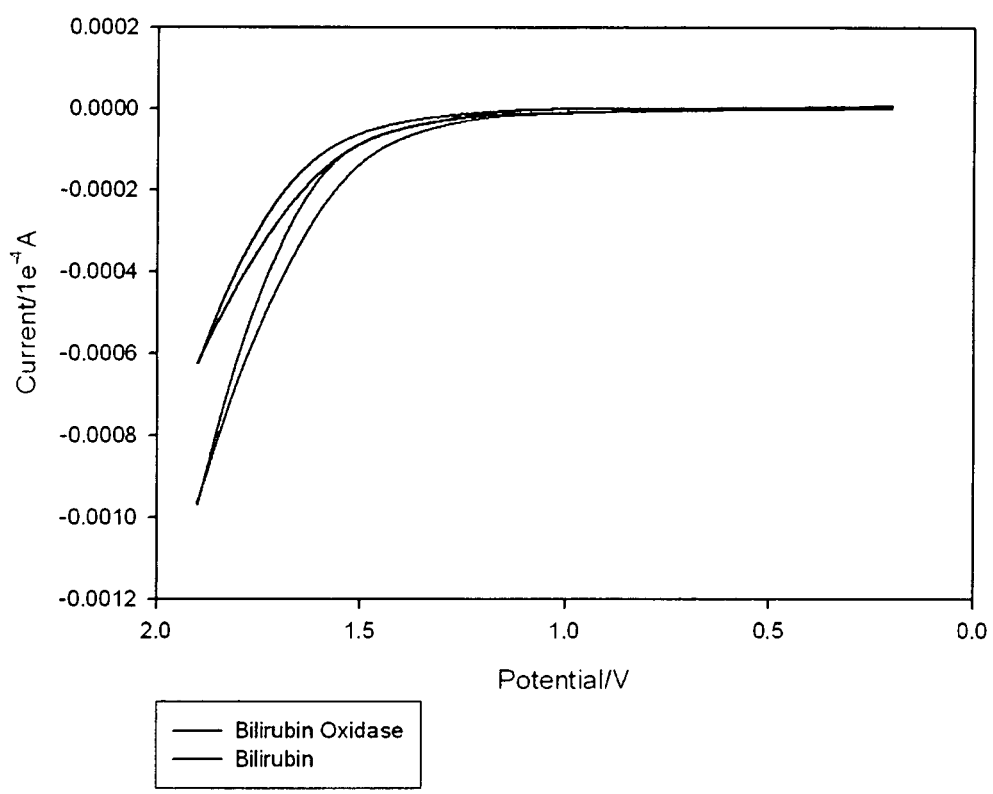
FIG. 5 is a voltammogram showing the best attained current density for a biofuel cell comprising a Nafion II prepared biocathode as described in Example 1.
Figure 6:
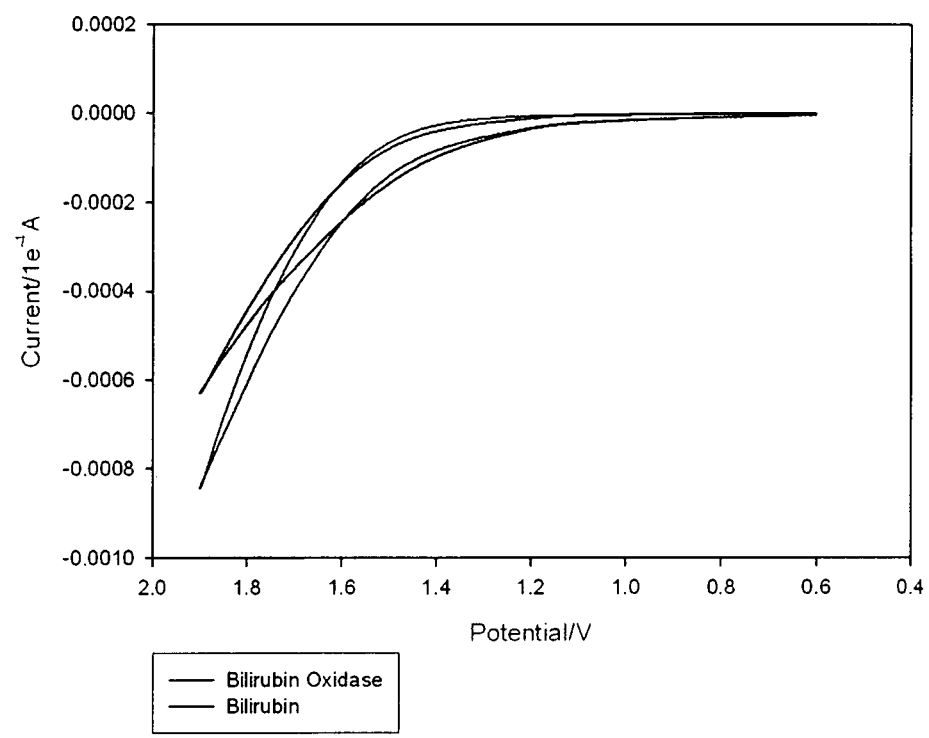
FIG. 6 is a voltammogram showing a middle range current density for a biofuel cell comprising a Nafion II prepared biocathode as described in Example 1.
Figure 7:
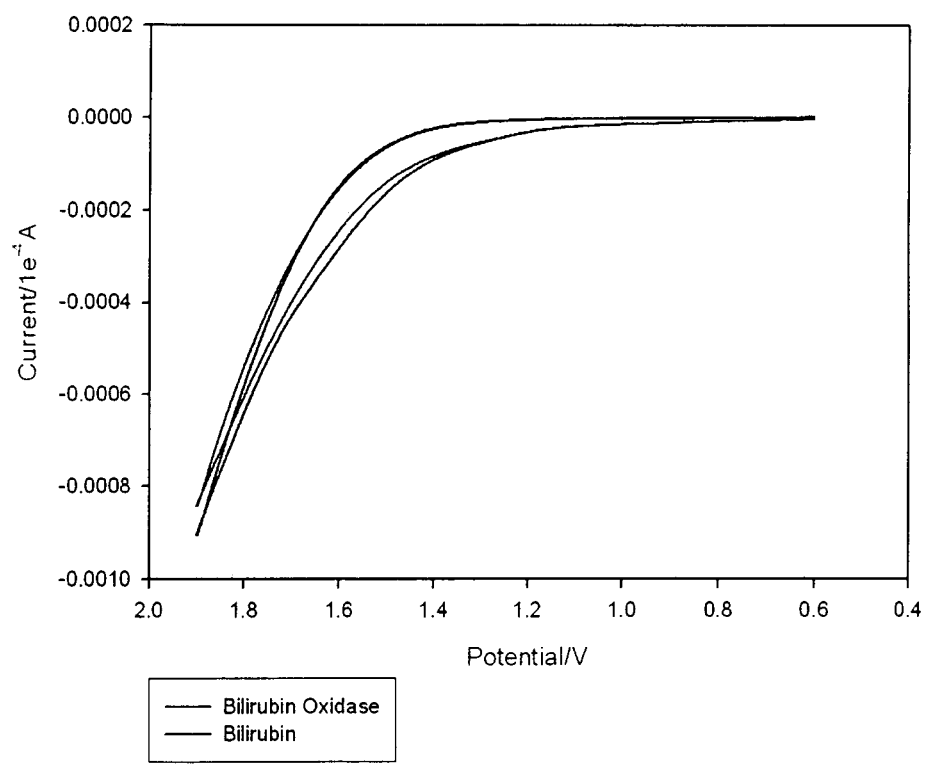
FIG. 7 is a voltammogram showing the worst attained current density for a biofuel cell comprising a Nafion II prepared biocathode as described in Example 1.
Figure 8:
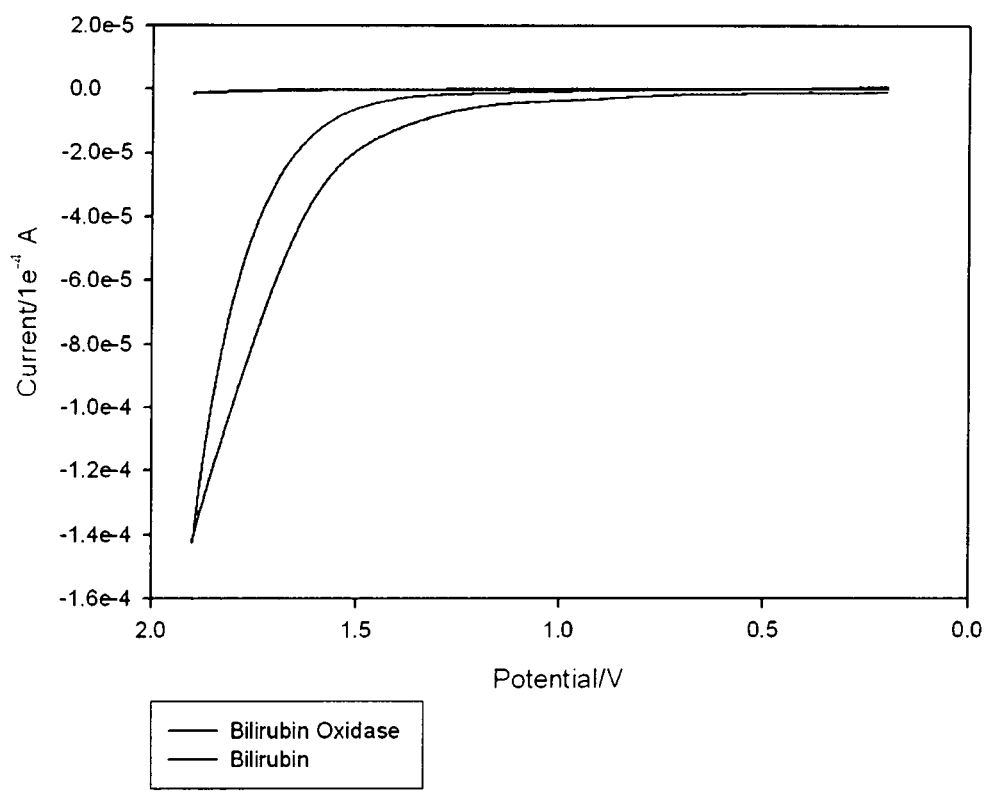
FIG. 8 is a voltammogram showing the best attained current density for a biofuel cell comprising a Nafion III prepared biocathode as described in Example 1.
Figure 9:
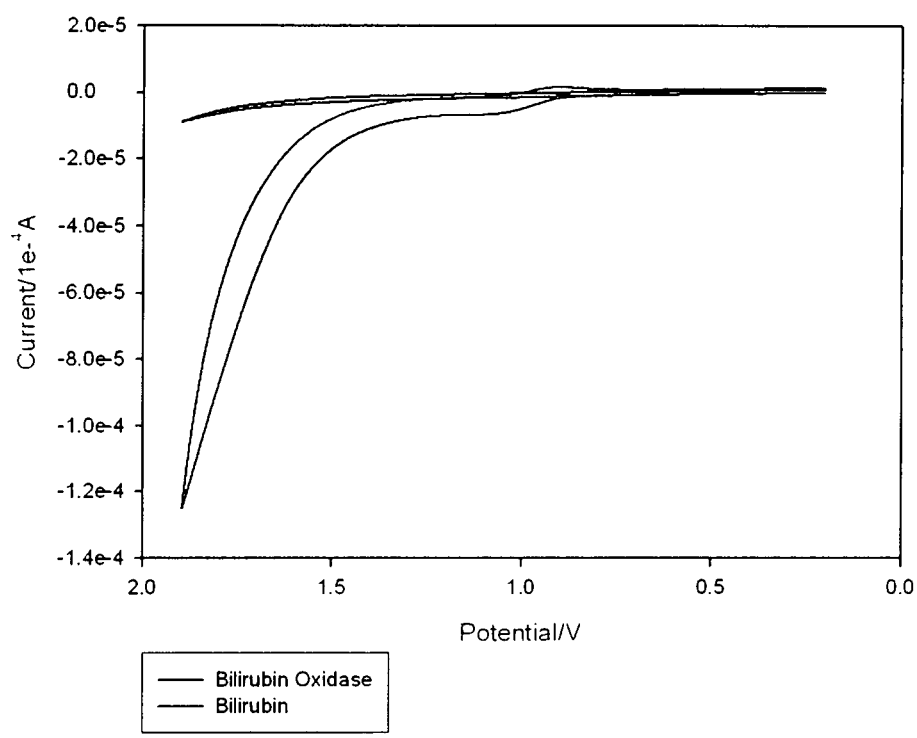
FIG. 9 is a voltammogram showing a middle range current density for a biofuel cell comprising a Nafion III prepared biocathode as described in Example 1.
Figure 10:
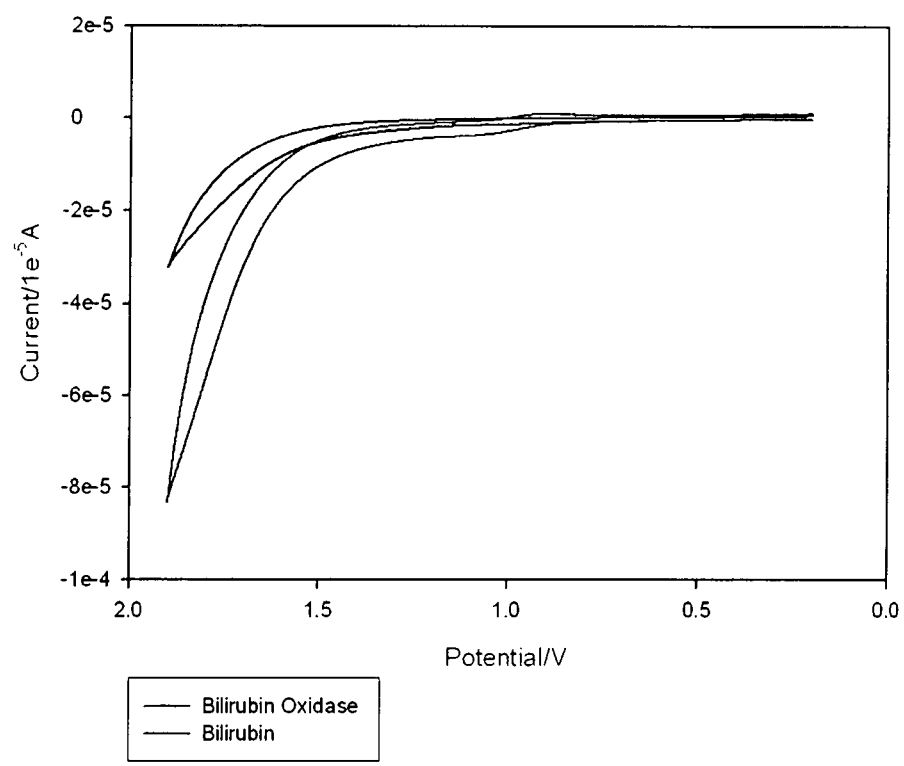
FIG. 10 is a voltammogram showing the worst attained current density for a biofuel cell comprising a Nafion III prepared biocathode as described in Example 1.

Among the various aspects of the present invention is a biocathode comprising an immobilized enzyme for use in an application wherein increased enzyme stability is advantageous; particularly for use in a biofuel cell. For use in a biocathode, the immobilization material forms a barrier that provides mechanical and chemical stability and by incorporating a sufficient concentration of an electron mediator or electrocatalyst into the immobilization material, it acts as an electron mediator. Thus, the enzyme is stabilized for a longer period than previously known and electron transport through the immobilization material is maximized. For purposes of the present invention, an enzyme is "stabilized" if it retains at least about 75% of its initial catalytic activity for at least about 30 days to about 365 days. Another aspect among the various aspects of the present invention is a fuel cell, which utilizes organic fuels (or a fuel fluid comprising hydrogen, ammonia or a hydrocarbon) to produce electricity via enzyme mediated redox (oxidation/reduction) reactions. Another aspect of the invention is a biofuel cell comprising an anode and a biocathode. The biocathode comprises an enzyme immobilization material that is permeable to an oxidant and immobilizes and stabilizes the enzyme, and that can immobilize and stabilize an electron mediator or electrocatalyst. The stability of the immobilized enzyme allows the biofuel cell to produce at least about 75% of the initial current for at least about 30 days to about 365 days.

Another aspect of the invention disclosed herein is an improved biofuel cell including the biocathode and a bioanode which incorporates or "traps" dehydrogenase enzymes within the micelles of the quaternary ammonium salt-treated Nafion® membranes (see U.S. Patent Applications 60/429, 829, 60/486,076 and Ser. No. 10/617,452, and Schrenk et al., Journal of Membrane Science 205 (2002) 3-10; and Thomas et al., Journal of Membrane Science 213 (2003) 55-66; which are incorporated herein by reference). Several advantages of the improved bioanode are that the enzymes are incorporated into an ion exchange polymer in three dimensions, which increases the power density and increases the stability of the enzymes, as well as providing a buffer for the enzyme, thereby dramatically increasing the effective lifetime of the enzymes well beyond any other biofuel cell developed to date.

I. Biofuel Cell

Among the various aspects of the invention is a biofuel cell utilizing a fuel fluid to produce electricity via enzyme mediated redox reactions taking place at electrodes with immobilized enzymes therein. As in a standard electrochemical cell, the anode is the site for an oxidation reaction of a fuel fluid with a concurrent release of electrons. The electrons are directed from the anode through an electrical connector to some power consuming device. The electrons move through the device to another electrical connector, which transports the electrons to the biofuel cell's biocathode where the electrons are used to reduce an oxidant to produce water. In this manner, the biofuel cell of the present invention acts as an energy source (electricity) for an electrical load external thereto. To facilitate the fuel fluid's redox reactions, the electrodes comprise an electron conductor, an electron mediator, an electrocatalyst for the electron mediator, an enzyme, and an enzyme immobilization material.

In accordance with the invention, the electron mediator is a compound that can accept electrons or donate electrons. In a presently preferred biofuel cell, the oxidized form of the electron mediator reacts with the fuel fluid and the enzyme to produce the oxidized form of the fuel fluid and the reduced form of the electron mediator at the bioanode. Subsequently or concurrently, the reduced form of the electron mediator reacts with the oxidized form of the electrocatalyst to produce the oxidized form of the electron mediator and the reduced form of the electrocatalyst. The reduced form of the electrocatalyst is then oxidized at the bioanode and produces electrons to generate electricity. The redox reactions at the bioanode, except the oxidation of the fuel fluid, can be reversible, so the enzyme, electron mediator and electrocatalyst are not consumed. Optionally, these redox reactions can be irreversible if an electron mediator and/or an electrocatalyst is added to provide additional reactant.

Alternatively, an electron conductor and an enzyme can be used wherein an electron mediator in contact with the bioanode is able to transfer electrons between its oxidized and reduced forms at unmodified electrodes. If the electron mediator is able to transfer electrons between its oxidized and reduced forms at an unmodified bioanode, the subsequent reaction between the electrocatalyst and the electron mediator is not necessary and the electron mediator itself is oxidized at the bioanode to produce electrons and thus, electricity.

At the biocathode, electrons originating from the bioanode flow into the biocathode's electron conductor. There, the electrons combine with an oxidized form of an electrocatalyst, which is in contact with the electron conductor. This reaction produces a reduced form of the electrocatalyst, which in turn reacts with an oxidized form of an electron mediator to produce a reduced form of the electron mediator and an oxidized form of the electrocatalyst. Next, the reduced form of the electron mediator reacts with an oxidized form of the oxidant to produce an oxidized form of the electron mediator and water. In one embodiment, an enzyme immobilization material permeable to the oxidant is present, which comprises the electrocatalyst and, optionally, the electron mediator, and which is capable of immobilizing and stabilizing the enzyme.

In an alternative embodiment of the biocathode, there is no electrocatalyst present. In this embodiment, the electrons combine with an oxidized form of the electron mediator to produce a reduced form of the electron mediator. Then, the reduced form of the electron mediator reacts with an oxidized form of an oxidant to produce an oxidized form of the electron mediator and water. In one embodiment, an enzyme immobilization material permeable to the oxidant is present, which optionally comprises the electron mediator, and which is capable of immobilizing and stabilizing the enzyme.

The biofuel cell of the present invention comprises a biocathode and an anode. In one embodiment, the anode is a bioanode. Generally, the bioanode comprises elements that effect the oxidation of fuel fluid whereby electrons are released and directed to an external electrical load. The resulting electrical current powers the electrical load, with electrons being subsequently directed to a biocathode where an oxidant is reduced and water is produced.

Now the inventors have succeeded in developing an improved biocathode, which may be used in concert with the above-described bioanode in a biofuel cell for practical electrical applications.

A. Biocathode

The biocathode in accordance with this invention comprises an electron conductor, an enzyme which is immobilized in an enzyme immobilization material, an electron mediator, and an electrocatalyst. In one embodiment, these components are adjacent to one another, meaning they are physically or chemically connected by appropriate means.

1. Electron Conductor

The electron conductor (electrode) is a substance that conducts electrons. The electron conductor can be organic or inorganic in nature as long as it is able to conduct electrons through the material. The electron conductor can be a carbon-based material, stainless steel, stainless steel mesh, a metallic conductor, a semiconductor, a metal oxide, or a modified conductor. In the preferred embodiment, the electron conductor is carbon cloth.

Particularly suitable electron conductors are carbon-based materials. Exemplary carbon-based materials are carbon cloth, carbon paper, carbon screen printed electrodes, carbon paper (Toray), carbon paper (ELAT), carbon black (Vulcan XC-72, E-tek), carbon black, carbon powder, carbon fiber, single-walled carbon nanotubes, double-walled carbon nanotubes, multi-walled carbon nanotubes, carbon nanotubes arrays, diamond-coated conductors, glassy carbon and mesoporous carbon. In addition, other exemplary carbon-based materials are graphite, uncompressed graphite worms, delaminated purified flake graphite (Superior® graphite), high performance graphite and carbon powders (Formula BT™, Superior® graphite), highly ordered pyrolytic graphite, pyrolytic graphite and polycrystalline graphite. A preferred electron conductor (support membrane) is a sheet of carbon cloth.

In a further embodiment, the electron conductor can be made of a metallic conductor. Suitable electron conductors can be prepared from gold, platinum, iron, nickel, copper, silver, stainless steel, mercury, tungsten, and other metals suitable for electrode construction. In addition, electron conductors which are metallic conductors can be constructed of nanoparticles made of cobalt, carbon, and other suitable metals. Other metallic electron conductors can be silver-plated nickel screen printed electrodes.

In addition, the electron conductor can be a semiconductor. Suitable semiconductor materials include silicon and germanium, which can be doped with other elements. The semiconductors can be doped with phosphorus, boron, gallium, arsenic, indium or antimony, or a combination thereof.

Other electron conductors can be metal oxides, metal sulfides, main group compounds (i.e., transition metal compounds), and materials modified with electron conductors. Exemplary electron conductors of this type are nanoporous titanium oxide, tin oxide coated glass, cerium oxide particles, molybdenum sulfide, boron nitride nanotubes, aerogels modified with a conductive material such as carbon, solgels modified with conductive material such as carbon, ruthenium carbon aerogels, and mesoporous silicas modified with a conductive material such as carbon.

2. Electron Mediators

The electron mediator is a compound that can accept or donate electron(s). Stated another way, the electron mediator has an oxidized form that can accept electron(s) to form the reduced form, wherein the reduced form can also donate electron(s) to produce the oxidized form. The electron mediator is a compound that can diffuse into the immobilization material and/or be incorporated into the immobilization material.

In one embodiment, the diffusion coefficient of the electron mediator is maximized. Stated another way, mass transport of the reduced form of the electron mediator is as fast as possible. A fast mass transport of the electron mediator allows for a greater current and power density of the biofuel cell in which it is employed.

The biocathode's electron mediator can be a protein such as stellacyanin, a protein byproduct such as bilirubin, a sugar such as glucose, a sterol such as cholesterol, a fatty acid, or a metalloprotein. The electron mediators can also be a coenzyme or substrate of an oxidase. In one preferred embodiment, the electron mediator at the biocathode is bilirubin.

The skilled artisan, in the practice of this invention will readily appreciate that many different electron transfer mediators, especially transition metal complexes with aromatic ligands, are useful in the practice of this invention. Stated another way, interaction of a transition metal complex having aromatic ligands with a polymer electrolyte membrane (PEM) alters the electronic properties of the PEM to provide a redox polymer.

3. Electrocatalyst for an Electron Mediator

Generally, the electrocatalyst (electron transport mediator or redox polymer) is a substance that facilitates the release of electrons at the electron conductor by reducing the standard reduction potential of the electron mediator.

Generally, electrocatalysts according to the invention are organometallic cations with standard reduction potentials greater than +0.4 volts. Exemplary electrocatalysts are transition metal complexes, such as osmium, ruthenium, iron, nickel, rhodium, rhenium, and cobalt complexes. Preferred organometallic cations using these complexes comprise large organic aromatic ligands that allow for large electron self exchange rates. Examples of large organic aromatic ligands include derivatives of 1,10-phenanthroline (phen), 2,2'-bipyridine (bpy) and 2,2',2''-terpyridines (terpy), such as Ru(phen)$_3^{+2}$, Fe(phen)$_3^{+2}$, Ru(bpy)$_3^{+2}$, Os(bpy)$_3^{+2}$, and Os(terpy)$_3^{+2}$. In a preferred embodiment, the electrocatalyst is a ruthenium compound. Most preferably, the electrocatalyst at the biocathode is Ru(bpy)$_3^{+2}$ (represented by Formula 1).

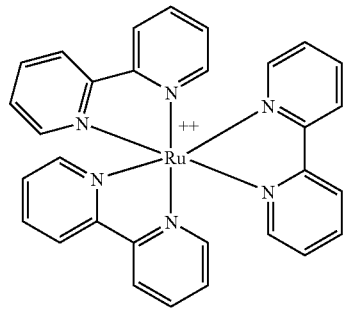

(1)

The electrocatalyst is present in a concentration that facilitates the efficient transfer of electrons. Preferably, the electrocatalyst is present at a concentration that makes the enzyme immobilization material conduct electrons. Particularly, the electrocatalyst is present at a concentration of from about 100 mM to about 3 M, more preferably from about 250 mM to about 2.25 M, still more preferably from about 500 mM to about 2 M, and most preferably from about 1.0 M to about 1.5 M.

The redox polymer may be the modified ion exchange membrane further modified to contain electron transport mediators (e.g., osmium or ruthenium complex, or aromatic organic cations). Many electron transport mediators or redox polymers, which are useful in the practice of this invention, are known in the art and described in U.S. Pat. Nos. 5,262,035; 5,262,305; 5,320,725; 5,264,105; 5,356,786; 5,593,852; 5,665,222; 6,294,281; and 6,531,239, which are incorporated herein by reference.

4. Enzyme

In accordance with the invention, an enzyme reduces an oxidant at the biocathode. Generally, naturally-occurring enzymes, man-made enzymes, artificial enzymes and modified naturally-occurring enzymes can be utilized. In addition, engineered enzymes that have been engineered by natural or directed evolution can be used. Stated another way, an organic or inorganic molecule that mimics an enzyme's properties can be used in an embodiment of the present invention.

Specifically, exemplary enzymes for use in a biocathode are oxidoreductases. Potential oxidoreductases include laccases and oxidases, such as glucose oxidase, alcohol-based oxidases, and cholesterol-based oxidases. In a preferred embodiment, the enzyme is a peroxidase or oxygen oxidoreductase, which catalyze the reduction hydrogen peroxide and oxygen, respectively. Exemplary oxygen oxidoreductases include laccase, cytochrome c oxidase, bilirubin oxidase and peroxidase. More preferably, the enzyme is an oxygen oxidoreductase having an optimum activity at a pH between about 6.5 and about 7.5. An oxidoreductase having an optimum activity at a pH from about 6.5 to about 7.5 is advantageous for applications directed to a physiological environment, such as a plant or a human or animal body. Most preferably, the enzyme is a bilirubin oxidase.

5. Enzyme Immobilization Material

An enzyme immobilization material is utilized in the biofuel cell at the bioanode and/or the biocathode. In one embodiment, the bioanode's enzyme immobilization material is permeable to the fuel fluid and immobilizes and stabilizes the enzyme. The immobilization material is permeable to the fuel fluid so the oxidation reaction of the fuel at the bioanode can be catalyzed by the immobilized enzyme.

Generally, an enzyme is used to catalyze redox reactions at the biocathode and/or the bioanode. In an electrode according to this invention, an enzyme is immobilized in an enzyme immobilization material that both immobilizes and stabilizes the enzyme. Typically, a free enzyme in solution loses its catalytic activity within a few hours to a few days, whereas a properly immobilized and stabilized enzyme can retain its catalytic activity for at least about 30 days to about 365 days. The retention of catalytic activity is defined as the enzyme having at least about 75% of its initial activity, which can be measured by chemiluminescence, electrochemical, UV-Vis, radiochemical, or fluorescence assay.

An immobilized enzyme is an enzyme that is physically confined in a certain region of the enzyme immobilization material while retaining its catalytic activity. There are a variety of methods for enzyme immobilization, including carrier-binding, cross-linking and entrapping. Carrier-binding is the binding of enzymes to water-insoluble carriers. Cross-linking is the intermolecular cross-linking of enzymes by bifunctional or multifunctional reagents. Entrapping is incorporating enzymes into the lattices of a semipermeable material. The particular method of enzyme immobilization is not critically important, so long as the enzyme immobilization material (1) immobilizes the enzyme, (2) stabilizes the enzyme, and (3) is permeable to the fuel fluid or oxidant.

With reference to the enzyme immobilization material's permeability to the fuel fluid or oxidant and the immobilization of the enzyme, in one embodiment, the material is permeable to a compound that is smaller than an enzyme. Stated another way, the enzyme immobilization material allows the movement of the fuel fluid or oxidant compound through it so the compound can contact the enzyme. The enzyme immobilization material can be prepared in a manner such that it contains internal pores, channels, openings or a combination thereof, which allow the movement of the compound throughout the enzyme immobilization material, but which constrain the enzyme to substantially the same space within the enzyme immobilization material. Such constraint allows the enzyme to retain its catalytic activity. In one preferred embodiment, the enzyme is confined to a space that is substantially the same size and shape as the enzyme, wherein the enzyme retains substantially all of its catalytic activity. The pores, channels, or openings have physical dimensions that satisfy the above requirements and depend on the size and shape of the specific enzyme to be immobilized.

In one embodiment, the enzyme is preferably located within a pore of the enzyme immobilization material and the compound travels in and out of the enzyme immobilization material through transport channels. The relative size of the pores and transport channels can be such that a pore is large enough to immobilize an enzyme, but the transport channels are too small for the enzyme to travel through them. Further, a transport channel preferably has a diameter of at least about 10 nm. In still another embodiment, the pore diameter to transport channel diameter ratio is at least about 2:1, 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, 10:1 or more. In yet another embodiment, preferably, a transport channel has a diameter of at least about 10 nm and the pore diameter to transport channel diameter ratio is at least about 2:1, 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, 10:1 or more.

With respect to the stabilization of the enzyme, the enzyme immobilization material provides a chemical and mechanical barrier to prevent or impede enzyme denaturation. To this end, the enzyme immobilization material physically confines the enzyme, preventing the enzyme from unfolding. The process of unfolding an enzyme from a folded three-dimensional structure is one mechanism of enzyme denaturation. In one embodiment, the immobilization material, preferably, stabilizes the enzyme so that the enzyme retains its catalytic activity for at least about 30 days to about 365 days. The retention of catalytic activity is defined by the number of days that the enzyme retains at least about 75% of its initial activity. The enzyme activity can be measured by chemiluminescence, electrochemical, UV-Vis, radiochemical or fluorescence assay wherein the intensity of the property is measured at an initial time. Typically, a fluorescence assay is used to measure the enzyme activity. A free enzyme in solution loses its catalytic activity within hours to a few days. Thus, the immobilization of the enzyme provides a significant advantage in stability. In another embodiment, preferably, the immobilized enzyme retains at least about 75% of its initial catalytic activity for at least about 30, 45, 60, 75, 90, 105, 120, 150, 180, 210, 240, 270, 300, 330, 365 days or more, preferably retaining at least about 80%, 85%, 90%, 95% or more of its initial catalytic activity for at least about 30, 45, 60, 75, 90, 105, 120, 150, 180, 210, 240, 270, 300, 330, 365 days or more.

In one embodiment, the enzyme immobilization material is a non-naturally occurring colloidal material. In another embodiment, the enzyme immobilization material is an acellular colloidal material, such as liposomes. An acellular material is not made up of and does not contain cells. A colloidal material is a substance that consists of particles dispersed throughout another substance which are too small for resolution with an ordinary light microscope but are incapable of passing through a semipermeable membrane. Furthermore, a colloidal material is a substance consisting of particles substantially larger than atoms or ordinary molecules but too small to be visible to the unaided eye. They can range in size from about $10^{-7}$ to $10^{-3}$ centimeters and are linked or bonded together in a variety of ways.

In yet another embodiment, the enzyme immobilization material has a micellar or inverted micellar structure. Generally, the molecules making up a micelle are amphipathic, meaning they contain a polar, hydrophilic group and a nonpolar, hydrophobic group. The molecules can aggregate to form a micelle, where the polar groups are on the surface of the aggregate and the hydrocarbon, nonpolar groups are sequestered inside the aggregate. Inverted micelles have the opposite orientation of polar groups and nonpolar groups. The amphipathic molecules making up the aggregate can be arranged in a variety of ways so long as the polar groups are in proximity to each other and the nonpolar groups are in proximity to each other. Also, the molecules can form a bilayer with the nonpolar groups pointing toward each other and the polar groups pointing away from each other. Alternatively, a bilayer can form wherein the polar groups can point toward each other in the bilayer, while the nonpolar groups point away from each other.

Generally, the micellar or inverted micellar enzyme immobilization material can be a polymer, a ceramic, a liposome, or any other material made of molecules that form a micellar or inverted micellar structure. Exemplary micellar or inverted micellar enzyme immobilization materials are perfluoro sulfonic acid-polytetrafluoro ethylene (PTFE) copolymer (or perfluorinated ion exchange polymer)(Nafion® or Flemion®), modified perfluoro sulfonic acid-polytetrafluoro ethylene (PTFE) copolymer (or modified perfluorinated ion exchange polymer)(modified Nafion®) or modified Flemion®), polysulfone, micellar polymers, poly(ethylene oxide) based block copolymers, polymers formed from microemulsion and/or micellar polymerization and copolymers of alkyl methacrylates, alkyl acrylates, and styrenes. Other exemplary micellar or inverted micellar immobilization materials are ceramics, sodium bis(2-ethylhexyl)sulfosuccinate, sodium dioctylsulfosuccinate, lipids, phospholipids, sodium dodecyl sulfate, decyltrimethylammonium bromide, tetradecyltrimethylammonium bromide, (4-[(2-hydroxyl-1-naphthalenyl)azo]benzenesulfonic acid monosodium salt), linoleic acids, linolenic acids, colloids, liposomes and micelle networks.

In one preferred embodiment, the micellar enzyme immobilization material is a modified perfluoro sulfonic acid-PTFE copolymer (or modified perfluorinated ion exchange polymer)(modified Nafion® or modified Flemion®) membrane. The perfluorinated ion exchange polymer membrane is modified with a hydrophobic cation that is larger than the ammonium ($NH^{4+}$) ion. The hydrophobic cation serves the dual function of (1) dictating the membrane's pore size and (2) acting as a chemical buffer to help maintain the pore's pH level, both of which further efforts to stabilize the enzyme.

With regard to the first function of the hydrophobic cation, mixture-casting a perfluoro sulfonic acid-PTFE copolymer (or perfluorinated ion exchange polymer) with a hydrophobic cation to produce a modified perfluoro sulfonic acid-PTFE copolymer (or modified perfluorinated ion exchange polymer)(Nafion® or Flemion®) membrane provides an enzyme immobilization material wherein the pore size is dependent on the size of the hydrophobic cation. Accordingly, the larger the hydrophobic cation, the larger the pore size. This function of the hydrophobic cation allows the pore size to be made larger or smaller to fit a specific enzyme by varying the size of the hydrophobic cation.

Regarding the second function of the hydrophobic cation, the properties of the perfluoro sulfonic acid-PTFE copolymer (or perfluorinated ion exchange polymer) membrane are altered by exchanging the hydrophobic cation for protons as the counterion to the —$SO^{3-}$ groups on the perfluoro sulfonic acid-PTFE copolymer (or perfluorinated ion exchange polymer) membrane. This change in counterion provides a buffering effect on the pH because the hydrophobic cation has a much greater affinity for the —$SO^{3-}$ sites than protons do. This buffering effect of the membrane causes the pH of the pore to remain substantially unchanged with changing solution pH; stated another way, the pH of the pore resists changes in the solution's pH. In addition, the membrane provides a mechanical barrier, which further protects the immobilized enzymes.

The following table demonstrates the buffering effect of the modified perfluoro sulfonic acid-PTFE copolymer membrane. The values represent the number of available exchange sites for protons per gram of modified perfluoro sulfonic acid-PTFE copolymer membrane; as the number of exchange sites available to protons decreases, the buffering capacity of the membrane toward the immobilized enzyme increases. The membrane abbreviations designate the following membranes: NH4Br is an ammonium bromide-modified Nafion® membrane, TMABr is a tetramethylammonium bromide-modified Nafion® membrane, TEABr is a tetraethylammonium bromide-modified Nafion® membrane, TpropABr is a tetrapropylammonium bromide-modified Nafion® membrane, TBABr is a tetrabutylammonium bromide-modified Nafion® membrane, and TpentABr is a tetrapentylammonium bromide-modified Nafion® membrane.

| Membrane | Mixture-Cast ($\times 10^{-6}$ mole/g) | Salt-Extracted ($\times 10^{-6}$ mole/g) |
| --- | --- | --- |
| Nafion ® | 907 ± 68 | — |
| $NH_4Br$ | 521 ± 74 | 591 ± 95 |
| TMABr | 171 ± 19 | 458 ± 27 |
| TEABr | 157 ± 4 | 185 ± 22 |
| TPropABr | 133 ± 6 | 138 ± 77 |
| TBABr | 8.68 ± 2.12 | 96 ± 23 |
| TPentABr | 2.71 ± 0.6 | 1.78 ± 1.66 |

In order to prepare a modified perfluoro sulfonic acid-PTFE copolymer (or perfluorinated ion exchange polymer) membrane, the first step is to cast a suspension of perfluoro sulfonic acid-PTFE copolymer (or perfluorinated ion exchange polymer), particularly Nafion®, with a solution of the hydrophobic cations to form a membrane. After extracting the excess hydrophobic cations and their salts from the original membrane, the membrane is re-cast. Upon re-casting, the membrane contains the hydrophobic cations in association with the —$SO^{3-}$ sites of the perfluoro sulfonic acid-PTFE copolymer (or perfluorinated ion exchange polymer) membrane.

In order to make more stable and reproducible quaternary ammonium salt-treated Nafion® membranes, the excess bromide salts must be removed from the casting solution. This salt-extracted membrane is formed by re-casting the mixture-cast membranes after the excess quaternary ammonium bromide and HBr salts have been extracted from the original membranes. Salt extraction of membranes retains the presence of the quaternary ammonium cations at the sulfonic acid exchange sites, but eliminates complications from excess salt that may be trapped in the pore or may cause voids in the equilibrated membrane. The chemical and physical properties of the salt-extracted membranes have been characterized by voltammetry, ion exchange capacity measurements, and fluorescence microscopy before enzyme immobilization. Exemplary hydrophobic cations are ammonium-based cations, quaternary ammonium cations, alkyltrimethylammonium cations, alkyltriethylammonium cations, organic cations, phosphonium cations, triphenylphosphonium, pyridinium cations, imidazolium cations, hexdecylpyridinium, ethidium, viologens, methyl viologen, benzyl viologen, bis(triphenylphosphine)iminium, metal complexes, bipyridyl metal complexes, phenanthroline-based metal complexes, $[Ru(bipyridine)_3]^{2+}$ and $[Fe(phenanthroline)_3]^{3+}$.

In one preferred embodiment, the hydrophobic cations are ammonium-based cations. In particular, the hydrophobic cations are quaternary ammonium cations. In another embodiment, the quaternary ammonium cations are represented by formula (2):

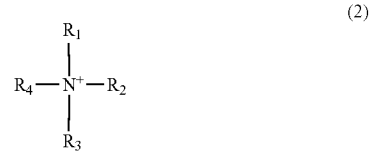

wherein $R_1$, $R_2$, $R_3$, and $R_4$ are independently hydrogen, hydrocarbyl, substituted hydrocarbyl, or heterocyclo wherein at least one of $R_1$, $R_2$, $R_3$, and $R_4$ is other than hydrogen. In a further embodiment, preferably, $R_1$, $R_2$, $R_3$, and $R_4$ are independently hydrogen, methyl, ethyl, propyl, butyl, pentyl, hexyl, heptyl, octyl, nonyl, decyl, undecyl, dodecyl, tridecyl or tetradecyl wherein at least one of $R_1$, $R_2$, $R_3$, and $R_4$ is other than hydrogen. In still another embodiment, $R_1$, $R_2$, $R_3$, and $R_4$ are the same and are methyl, ethyl, propyl, butyl, pentyl or hexyl. In yet another embodiment, preferably, $R_1$, $R_2$, $R_3$, and $R_4$ are butyl. Preferably, the quaternary ammonium cation is tetrabutylammonium, triethylhexylammonium or dodecyl trimethylammonium.

Mixture-cast films of quaternary ammonium salts or surfactants (e.g., TBAB, triethylhexylammonium bromide, trimethyldodecylammonium bromide, and phenyltrimethylammonium bromide) and Nafion® have increased the mass transport of small analytes through the films and decreased the selectivity of the enzyme immobilization membrane against anions. These enzyme immobilization membranes have very similar conductivities as unmodified Nafion, but they have a much higher preference to the quaternary ammonium bromide than to the proton, as shown by titrating the number of available exchange sites to protons in the enzyme immobilization membranes. Therefore, these films have similar electrical properties, but very different acid/base properties. The treated enzyme immobilization membranes maintain their neutral pH over a wide range of buffer pHs. In light of these advantages, the preferred enzyme immobilization material is a quaternary ammonium salt treated perfluoro sulfonic acid-PTFE copolymer (or modified perfluorinated ion exchange polymer)(modified Nafion® or modified Flemion®) membrane. More preferably, the enzyme immobilization material is a TBAB-modified Nafion® membrane material. Even more preferably, the enzyme immobilization material is a triethylhexylammonium bromide-modified Nafion® membrane material, phenyltrimethylammonium bromide-modified Nafion® membrane material, or a trimethyloctylammonium bromide-modified Nafion® membrane material.

In a preferred embodiment, the membrane comprises a material that is capable of forming micelles or inverted micelles, which are capable of incorporating and stabilizing a redox enzyme, along with incorporating an electron transport mediator. Preferably, the membrane material is a modified ion exchange membrane. More preferably, the membrane material is a quaternary ammonium, surfactant or phosphonium salt treated perfluoro sulfonic acid-PTFE copolymer (or modified perfluorinated ion exchange polymer, e.g., modified Nafion® or modified Flemion®) membrane. Most preferably the membrane material is a tetrabutylammonium bromide (TBAB) treated Nafion® membrane material. The modification results in a near neutral pH (~7.4) within the micelles of the ion exchange polymer.

6. Biocathode Embodiments

In one embodiment, the biocathode comprises an enzyme immobilization material, which acts to immobilize the cathode's enzyme while facilitating the redox reactions taking place at the biocathode. The enzyme, electrocatalyst, and electron mediator are preferably located within a pocket or micelle of the enzyme immobilization material. In a preferred embodiment, the enzyme immobilization material comprises a material that is capable of forming micelles or inverted micelles, which in turn are capable of incorporating and stabilizing an enzyme, and other areas such as pores, channels, openings, or a combination thereof that can incorporate the electrocatalyst and electron mediator. Preferably, the micelle also has buffering capability, i.e., the micellar structure comprises a buffering moiety. This buffered micellar structure of the enzyme immobilization material facilitates the direct transfer of electrons to and from the electrode and the electrocatalyst or electron mediator.

Advantageously, in many of the various embodiments, the concentration of the electrocatalyst or electron mediator in the enzyme immobilization material is sufficient to make the enzyme immobilization material conduct electrons. The concentration of the electrocatalyst or electron mediator in the enzyme immobilization material is from about 100 mM to about 3 M, more preferably from about 250 mM to about 2.25 M, still more preferably from about 500 mM to about 2 M, and most preferably from about 1.0 M to about 1.5 M. This concentration of electrocatalyst or electron mediator facilitates a rate of electron transfer that allows for maximization of the current density. When the enzyme immobilization material is a polymer, preferably, the above concentrations of the electrocatalyst or electron mediator alter the electronic properties of the polymeric enzyme immobilization material to make it a redox polymer.

In yet another embodiment, the invention is drawn to a fuel cell comprising a biocathode and an anode, wherein the biocathode comprises an electrocatalyst, an enzyme immobilization material, and an enzyme. The enzyme is incorporated within a micellar compartment of the enzyme immobilization material. Preferably, the enzyme immobilization material is a salt-extracted quaternary ammonium treated perfluorinated ion exchange polymer. Commercially available perfluorinated ion exchange polymers include Nafion® (DuPont) and Flemion® (Asahi Glass). Preferably, the perfluorinated ion exchange polymer is a Nafion® polymer or Flemion® polymer. Preferred quaternary ammonium salts include tetrabutylammonium bromide. A preferred electrocatalyst is polymethylene green. The biocathode may comprise more than one different enzyme.

See FIG. 1 for a schematic of the redox reactions taking place at a biocathode in a preferred embodiment. There, electrons from the electron conductor (electrode) (13) are used in the redox reactions between the electrocatalyst (Ru(bipyridine)$_3^{+2}$) located in (15), the electron mediator (bilirubin), the enzyme (bilirubin oxidase) (14), and an oxidant (11) to form a water byproduct. The enzyme (14) is stabilized in a micellar structure (12) of the enzyme immobilization material (10).

In one embodiment, the invention is drawn to an improved biocathode, which utilizes an ion exchange membrane that comprises one or more oxidoreductase enzymes and one or more electron transport mediators, thereby facilitating the efficient manufacturing and efficient functioning of the biocathode. Such a membrane is referred herein as a "dual function membrane." The dual function membrane may be applied to any electron conducting material.

In another embodiment, the invention is drawn to an improved biocathode, which utilizes an ion exchange membrane that comprises one or more oxidoreductase enzymes and one or more electrocatalysts, thereby facilitating the efficient manufacturing and efficient functioning of the biocathode. Such a membrane is referred herein as a "dual function membrane." The dual function membrane may be applied to any electron conducting material.

The invention is drawn to a biocathode comprising a dual functioning membrane, which functions as an enzyme immobilizing membrane and a redox membrane, a cathode enzyme, which is preferably located within a pocket or micelle of the dual functioning membrane, and an electron transfer mediator.

The biocathode of the invention has useful power densities and stable enzymes that function at physiological or near neutral pH and retain activity over extended periods of time, i.e., greater than 10 days at ambient temperature. Generally, a biocathode comprises a redox enzyme, such as an oxygen oxidoreductase, that catalyzes the reduction of oxygen using electrons provided by the anode (from the completed electrical circuit). The biocathode of the instant invention may be used as part of a fuel cell in conjunction with any type of anode. Preferably, the biocathode is used in conjunction with a bioanode in a biofuel cell.

In a preferred embodiment, the biocathode dual function membrane comprises a cathode enzyme, which is preferably an oxygen oxidoreductase (e.g., laccase, bilirubin oxidase), more preferably an oxygen oxidoreductase having an optimal activity at or near neutral pH, such as bilirubin oxidase, which is immobilized in a micelle that has buffering capability. Preferably, the cathode enzyme is immobilized in a perfluorinated ion exchange membrane that has been modified to accommodate an enzyme within a micellar structure and wherein that micellar structure comprises a buffering moiety, such as an ammonium or phosphonium ion. Most preferably, the cathode enzyme is immobilized in a salt-extracted tetrabutylammonium bromide (TBAB), triethylhexylammonium halide (TEHA), or trimethyldodecylammonium halide (TMDA) treated Nafion® membrane (as described in U.S. patent application Ser. No. 10/617,452 and below for use in a preferred bioanode). Furthermore, this buffered micellar membrane contains an electron transport mediator, such as a ruthenium, nickel, rhenium, rhodium, iron, cobalt, or osmium complex comprising an aromatic ligand, to facilitate the direct transfer of electrons to and from the electrode and enzyme catalyst. Alternatively, this buffered micellar membrane contains an electrocatalyst, such as a ruthenium, nickel, rhenium, rhodium, iron, cobalt, or osmium complex comprising an aromatic ligand, to facilitate the direct transfer of electrons to and from the electrode and enzyme catalyst.

B. Bioanode

In one embodiment, the bioanode comprises an electron conductor and an enzyme which is immobilized in an enzyme immobilization material. In another embodiment, the bioanode optionally further comprises an electrocatalyst for an electron mediator. An electrocatalyst can be absent from the bioanode when the bioanode contacts an electron mediator that is capable of undergoing a reversible redox reaction at the electron conductor. The above-identified components of the bioanode are adjacent to one another; meaning they are physically or chemically connected by appropriate means. Other embodiments are detailed infra at I.A.6. As the components are generally the same as the biocathode components, the following discussion concerns the differences in composition of the respective elements and differences in function, where appropriate.

1. Electron Conductor

As with the biocathode, the bioanode's electron conductor can be organic or inorganic in nature as long as it is able to conduct electrons through the material. In one embodiment, the bioanode electron conductor is carbon cloth.

2. Electron Mediators

The bioanode electron mediator serves to accept or donate electron(s), readily changing from oxidized to reduced forms. The electron mediator is a compound that can diffuse into the immobilization material and/or be incorporated into the immobilization material. As with the biocathode, it is preferred that the electron mediator's diffusion coefficient is maximized.

Exemplary electron mediators are nicotinamide adenine dinucleotide ($NAD^+$), flavin adenine dinucleotide (FAD), nicotinamide adenine dinucleotide phosphate (NADP), or pyrroloquinoline quinone (PQQ), or equivalents of each. Other exemplary electron mediators are phenazine methosulfate, dichlorophenol indophenol, short chain ubiquinones, potassium ferricyanide, a protein, a metalloprotein, and stellacyanin. In one preferred embodiment, the electron mediator at the bioanode is $NAD^+$.

Where the electron mediator cannot undergo a redox reaction at the electron conductor by itself, the bioanode comprises an electrocatalyst for an electron mediator which facilitates the release of electrons at the electron conductor. Alternatively, a reversible redox couple that has a standard reduction potential of 0.0V±0.5 V is used as the electron mediator. Stated another way, an electron mediator that provides reversible electrochemistry on the electron conductor surface can be used. The electron mediator is coupled with a naturally occurring enzyme that is dependent on that electron mediator, an enzyme modified to be dependent on that electron mediator, or a synthetic enzyme that is dependent on that electron mediator. Examples of electron mediators that provide reversible electrochemistry on the electron conductor surface is pyrroloquinoline quinone (PQQ), phenazine methosulfate, dichlorophenol indophenol, short chain ubiquinones and potassium ferricyanide. In this embodiment, the preferred electron mediator utilized with the bioanode is PQQ. Due to the capability of the electron mediator to provide reversible electrochemistry at the electron conductor surface, no electrocatalyst is necessary to catalyze the redox reaction in this embodiment.

Preferred compounds that are substrates for electrocatalysis by the redox polymer of the bioanode include reduced adenine dinucleotides, such as NADH, $FADH_2$ and NADPH.

3. Electrocatalyst for an Electron Mediator

Generally, the electrocatalyst is a substance that facilitates the release of electrons at the electron conductor. Stated another way, the electrocatalyst improves the kinetics of a reduction or oxidation of an electron mediator so the electron mediator reduction or oxidation can occur at a lower standard reduction potential. The electrocatalyst can be reversibly oxidized at the bioanode to produce electrons and thus, electricity. When the electrocatalyst is adjacent to the electron conductor, the electrocatalyst and electron conductor are in electrical contact with each other, but not necessarily in physical contact with each other. In one embodiment, the electron conductor is part of, associates with, or is adjacent to an electrocatalyst for an electron mediator.

Generally, the electrocatalyst can be an azine, a conducting polymer or an electroactive polymer. Exemplary electrocatalysts are methylene green, methylene blue, luminol, nitrofluorenone derivatives, azines, osmium phenanthrolinedione, catechol-pendant terpyridine, toluene blue, cresyl blue, nile blue, neutral red, phenazine derivatives, tionin, azure A, azure B, toluidine blue O, acetophenone, metallophthalocyanines, nile blue A, modified transition metal ligands, 1,10-phenanthroline-5,6-dione, 1,10-phenanthroline-5,6-diol, [Re(phen-dione)(CO)$_3$Cl], [Re(phen-dione)$_3$](PF$_6$)$_2$, poly(metallophthalocyanine), poly(thionine), quinones, diimines, diaminobenzenes, diaminopyridines, phenothiazine, phenoxazine, toluidine blue, brilliant cresyl blue, 3,4-dihydroxybenzaldehyde, poly(acrylic acid), poly(azure 1), poly(nile blue A), poly(methylene green), poly(methylene blue), polyaniline, polypyridine, polypyrole, polythiophene, poly(thieno[3,4-b]thiophene), poly(3-hexylthiophene), poly(3,4-ethylenedioxypyrrole), poly(isothianaphthene), poly(3,4-ethylenedioxythiophene), poly(difluoroacetylene), poly(4-dicyanomethylene-4H-cyclopenta[2,1-b; 3,4-b'] dithiophene), poly(3-(4-fluorophenyl)thiophene), poly (neutral red), a protein, a metalloprotein, or stellacyanin. In one preferred embodiment, the electrocatalyst for the electron mediator is poly(methylene green).

4. Enzyme

An enzyme catalyzes the oxidation of the fuel fluid at the bioanode. As enzymes also reduce an oxidant at the biocathode, they are more generally described above at I.A.4. Generally, naturally-occurring enzymes, man-made enzymes, artificial enzymes and modified naturally-occurring enzymes can be utilized. In addition, engineered enzymes that have been engineered by natural or directed evolution can be used. Stated another way, an organic or inorganic molecule that mimics an enzyme's properties can be used in an embodiment of the present invention.

Specifically, exemplary enzymes for use in a bioanode are oxidoreductases. In one preferred embodiment, the oxidoreductases act on the CH—OH group or CH—NH group of the fuel (alcohols, ammonia compounds, carbohydrates, aldehydes, ketones, hydrocarbons, fafty acids and the like).

In another preferred embodiment, the enzyme is a dehydrogenase. Exemplary enzymes in this embodiment include alcohol dehydrogenase, aldehyde dehydrogenase, formate dehydrogenase, formaldehyde dehydrogenase, glucose dehydrogenase, glucose oxidase, lactatic dehydrogenase, lactose dehydrogenase or pyruvate dehydrogenase. Preferably, the enzyme is an alcohol dehydrogenase (ADH).

In a presently preferred embodiment, the enzyme is a PQQ-dependent alcohol dehydrogenase. PQQ is the coenzyme of PQQ-dependent ADH and remains electrostatically attached to PQQ-dependent ADH and therefore the enzyme will remain in the membrane leading to an increased lifetime and activity for the biofuel cell. The PQQ-dependent alcohol dehydrogenase enzyme is extracted from gluconobacter. When extracting the PQQ-dependent ADH, it can be in two forms: (1) the PQQ is electrostatically bound to the PQQ-dependent ADH or (2) the PQQ is not electrostatically bound the PQQ-dependent ADH. For the second form where the PQQ is not electrostatically bound to the PQQ-dependent ADH, PQQ is added to the ADH upon assembly of the bioanode. In a presently preferred embodiment, the PQQ-dependent ADH is extracted from gluconobacter with the PQQ electrostatically bound.

5. Enzyme Immobilization Material

As noted above at I.A and I.B, an enzyme immobilization material is utilized in the biofuel cell at the bioanode and/or the biocathode. Further detail regarding the composition of the enzyme immobilization material and the immobilization mechanism can be found supra at I.A.5. In one embodiment, the bioanode's enzyme immobilization material is permeable to the fuel fluid and immobilizes and stabilizes the enzyme. The immobilization material is permeable to the fuel fluid so the oxidation of the fuel fluid at the bioanode can be catalyzed by the immobilized enzyme. Preferably, the enzyme immobilization material is a quaternary ammonium salt treated perfluoro sulfonic acid-PTFE copolymer (or modified perfluorinated ion exchange polymer)(modified Nafion® or modified Flemion®) membrane. More preferably, the enzyme immobilization material is a tetrabutylammonium bromide (TBAB) treated Nafion® membrane material. Even more preferably, the enzyme immobilization material is a triethylhexylammonium bromide treated Nafion® membrane material, a trimethyloctylammonium bromide treated Nafion® membrane material, or a phenyltrimethylammonium bromide treated Nafion® membrane material.

6. Bioanode Embodiments

In a further embodiment, preferably, the bioanode is composed of an electron conductor that is modified by adsorbing, polymerizing, or covalently bonding an electrocatalyst onto the electron conductor. This embodiment has an advantage of increasing the surface area of the electron conductor. The treatment of the electron conductor by adsorbing an electrocatalyst on the surface of the electron conductor prior to fabrication and subsequent chemical or electrochemical polymerization of the electrocatalyst leads to higher catalytic activities compared to untreated electron conductors.

In a further embodiment, the electron mediator can be physically bound to the enzyme. The physical bond can be a covalent or ionic bond between the electron mediator and the enzyme. In still another embodiment, if the electron mediator is capable of reversible electrochemistry at the electron conductor, the electron mediator can be physically bound to the enzyme and the electron mediator can also be physically bound to the electron conductor.

In still another embodiment, the electron mediator is immobilized in the immobilization material. In a preferred embodiment, the electron mediator is oxidized $NAD^+$ immobilized in a cation-modified perfluoro sulfonic acid-PTFE copolymer (cation-modified Nafion®) membrane. In this embodiment, after the fuel fluid is added to the cell, the $NAD^+$ is reduced to NADH and the NADH can diffuse through the cation-modified perfluoro sulfonic acid-PTFE copolymer (cation-modified Nafion®) membrane.

In another embodiment, dehydrogenase enzymes are immobilized in salt-extracted tetrabutylammonium/perfluorinated ion exchange polymer membranes (e.g., Nafion® membranes or Flemion® membranes [Asahi Glass Co., Tokyo]). The salt-extracted polymer suspension is neutral, and buffered enzyme solutions can be added to this suspension. The mixture can be cast onto a bioanode to form a modified bioanode, wherein the enzyme is immobilized near the bioanode's surface.

In another embodiment, the bioanode includes a modified enzyme immobilization material, which results in a neutral pH within the micelles of the material, and to one or more enzymes, which is/are incorporated within a micelle of the modified enzyme immobilization material. The preferred enzyme immobilization material is a Nafion® polymer. Preferred enzymes are redox enzymes, such as dehydrogenases, which catalyze the oxidation of an organic fuel and the reduction of an electron mediator.

In yet another embodiment, the invention is drawn to a fuel cell comprising a bioanode and a biocathode, wherein the bioanode comprises an electrocatalyst, an enzyme immobilization material, and an enzyme. The enzyme is incorporated within a micellar compartment of the enzyme immobilization material. Preferably, the enzyme immobilization material is a salt-extracted quaternary ammonium treated perfluorinated ion exchange polymer. Commercially available perfluorinated ion exchange polymers include Nafion® (DuPont) and Flemion® (Asahi Glass). Preferably, the perfluorinated ion exchange polymer is a Nafion® polymer or Flemion® polymer. Preferred quaternary ammonium salts include tetrabutylammonium bromide. A preferred electrocatalyst is polymethylene green. The bioanode may comprise more than one different enzyme, such as an alcohol dehydrogenase and an aldehyde dehydrogenase.

Methods of making and using bioanodes, which are useful in the manufacture and use of biofuel cells comprising the instant biocathode, are known in the art. A preferred bioanode is described in U.S. patent application Ser. No. 10/617,452, which is incorporated in its entirety herein by reference. Other potentially useful bioanodes are described in U.S. Pat. Nos. 6,531,239 and 6,294,281, which are also incorporated herein by reference.

Briefly, in one embodiment of the preferred bioanode, which is useful in the making and using of the biofuel cell comprising the biocathode disclosed above, comprises an anode redox enzyme that catalyzes the oxidation of an organic fuel. Generally, an anode provides a source of electrons for an electrical circuit or electrical potential. An exemplary preferred bioanode comprises a supporting membrane or structure, such as a carbon fiber cloth or sheet of carbon felt, which is juxtaposed to a redox polymer membrane, which is juxtaposed to a modified ion exchange polymer membrane comprising buffered micelles in which the anode redox enzymes are immobilized.

A presently preferred bioanode comprises a carbon electron conductor coated with PQQ-dependent alcohol dehydrogenase immobilized in a cation-modified perfluoro sulfonic acid-PTFE copolymer. The carbon electron conductor may be a glassy carbon electrode, carbon felt, carbon paper and the like.

C. Fuel Fluid and Oxidant

A fuel fluid that can be oxidized to produce electrons at the bioanode and an oxidant that can be reduced to produce water at the biocathode are components of the biofuel cell of this invention.

The fuel fluid for the bioanode is consumed in the oxidation reaction of the electron mediator and the immobilized enzyme. The fuel fluid's molecular size is small enough so the diffusion coefficient through the enzyme immobilization material is large. Exemplary fuel fluids are hydrogen, ammonia, alcohols (such as methanol, ethanol, propanol, isobutanol, butanol and isopropanol), allyl alcohols, aryl alcohols, glycerol, propanediol, mannitol, glucuronate, aldehyde, carbohydrates (such as glucose, glucose-1, D-glucose, L-glucose, glucose-6-phosphate, lactate, lactate-6-phosphate, D-lactate, L-lactate, fructose, galactose-1, galactose, aldose, sorbose and mannose), glycerate, coenzyme A, acetyl Co-A, malate, isocitrate, formaldehyde, acetaldehyde, acetate, citrate, L-gluconate, beta-hydroxysteroid, alpha-hydroxysteroid, lactaldehyde, testosterone, gluconate, fatty acids, lipids, phosphoglycerate, retinal, estradiol, cyclopentanol, hexadecanol, long-chain alcohols, coniferyl-alcohol, cinnamyl-alcohol, formate, long-chain aldehydes, pyruvate, butanal, acyl-CoA, steroids, amino acids, flavin, NADH, $NADH_2$, NADPH, $NADPH_2$, hydrocarbons, and amines. In a preferred embodiment, the fuel fluid is an alcohol, more preferably methanol and/or ethanol; and most preferably ethanol.

The oxidant for the biocathode is consumed in the reduction reaction of the electron mediator and the immobilized enzyme using electrons supplied by the bioanode. The oxidant's molecular size is small enough so the diffusion coefficient through the enzyme immobilization material is large. A variety of means of supplying a source of the oxidant known in the art can be utilized.

In a preferred embodiment, the oxidant is gaseous oxygen, which is transported to the biocathode via diffusion. In another preferred embodiment, the oxidant is a peroxide compound.

II. Biofuel Cell Embodiments

In another embodiment, the invention is drawn to a biofuel cell comprising an improved biocathode. Generally, a biofuel cell utilizes organic fuels (hydrocarbons, amines, alcohols, carbohydrates and the like) as a source of energy and redox enzymes to catalyze the oxidation of the organic fuel. The biofuel cell of the instant invention may be used in applications that require an electrical supply, such as, but not limited to electronic devices and equipment, toys, novelties, internal medical devices, and electrically powered vehicles. The fuel cell of the instant invention may also be implanted into a living organism, wherein the organic fuel is derived from the organism and the fuel cell powers a device implanted in the living organism.

Minteer et al. have succeeded in further improving the practical biofuel cell disclosed in patent applications 60/429,829, 60/486,076 and Ser. No. 10/617,452, by developing a bioelectrode and method of manufacturing a bioelectrode that not only incorporates a cathode enzyme (e.g., laccases, oxidases, peroxidases and the like) or an anode enzyme (e.g., oxidases, dehydrogenases and the like) in a quaternary ammonium (or quaternary phosphonium) salt-treated perfluorinated ion-exchange membrane (e.g., Nafion® and Flemion®), but further incorporates an electron transport mediator, such as a ruthenium, iron, cobalt, osmium, nickel, chromium, rhenium or rhodium in a complex with an aromatic ligand, within the micelles of the quaternary ammonium (or quaternary phosphonium) salt-treated perfluorinated ion-exchange membrane. Thus, the polymer/enzyme complex also functions as a redox polymer ("dual functioning membrane"). This innovation increases the efficiency of electron transfer between the enzyme and the electrode.

In another embodiment, the invention is drawn to a biofuel cell, which is useful in the production of an electric current in physiological environments as well as non-physiological environments, comprising a biocathode (as described supra) and an anode. Preferably, the anode is a bioanode comprising a membrane capable of forming micelles with a buffered interior and containing an immobilized anode enzyme. The bioanode may comprise a separate electron conducting membrane (redox membrane), such as a polymer of methylene green. Alternatively, the buffered micellar membrane containing an immobilized anode enzyme may also function as a redox membrane, wherein the micellar membrane further contains an electron transport mediator, as described above for the biocathode.

The biofuel cell of the instant invention may comprise a polymer electrolyte membrane ("PEM" or salt bridge, e.g., Nafion® 117) to separate the anode compartment from the cathode compartment. However, given the innovation of having the anode and cathode enzymes immobilized in their respective ion exchange membranes, another embodiment of the biofuel cell does not comprise a PEM to separate the anode compartment from the cathode compartment ("membraneless biofuel cell"). To make a membraneless biofuel cell, a biocathode and bioanode are used. The preferential selectivity of the enzymes used in the bioanode and biocathode for catalysis of either the oxidant or the fuel fluid reaction allows the anode compartment not to be physically separated from the cathode compartment.

Figure 13:
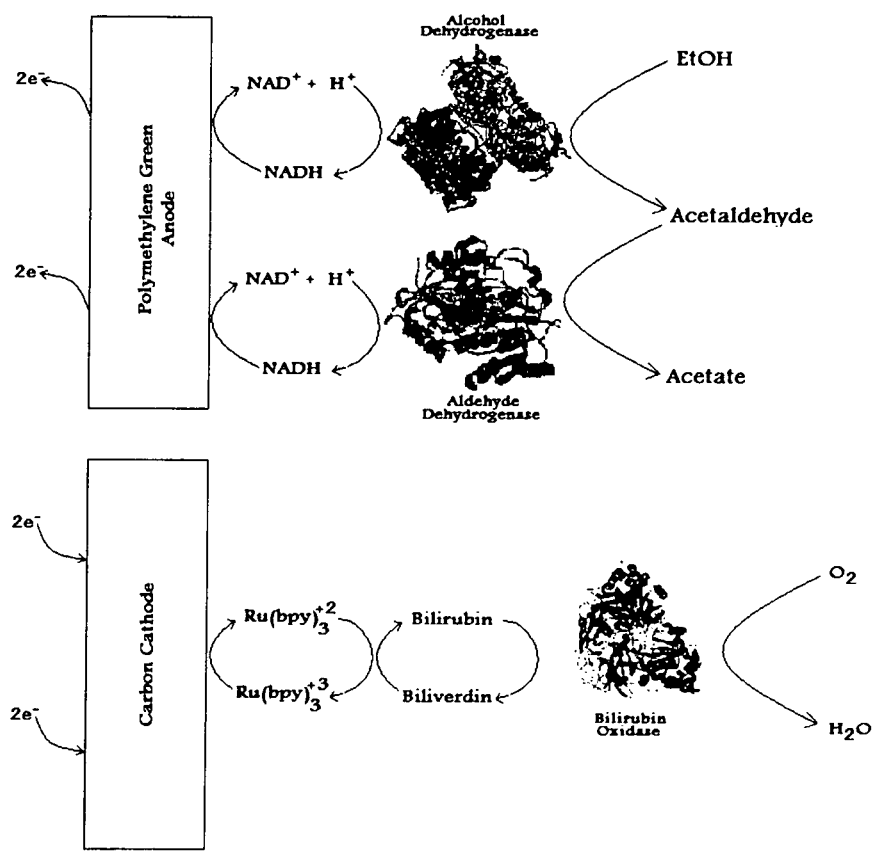
FIG. 13 is a schematic of the chemistry occurring at the biocathode and bioanode of the ethanol/oxygen biofuel cell.
Figure 14:
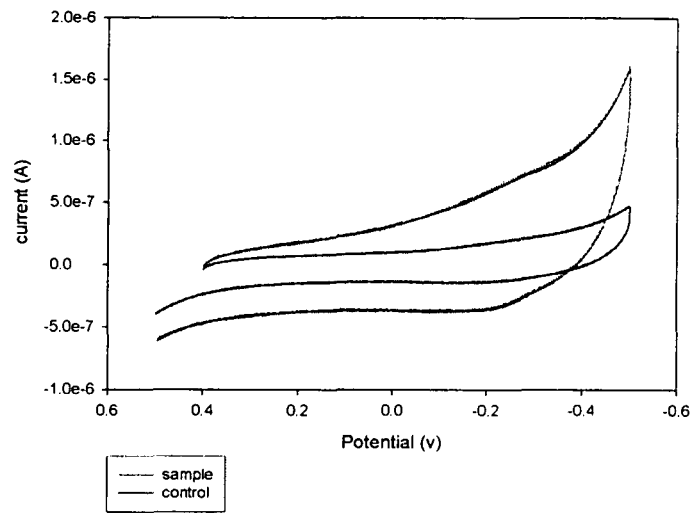
FIG. 14 is a representative cyclic voltammogram of 1.0 mM PQQ/1.0 mM ethanol in pH 7.15 phosphate buffer at a PQQ-dependent alcohol dehydrogenase immobilized TBAB/Nafion®) membrane at 100 mV/s.

In a presently preferred embodiment, the biofuel cell comprises a biocathode comprising a carbon cloth coated with a quaternary ammonium modified Nafion® membrane containing bilirubin and bilirubin oxidase. The coated carbon cloth is soaked in 1 mM $Ru(bpy)_3^{+2}$ to allow the redox mediator $Ru(bpy)_3^{+2}$ to preconcentrate in the membrane. In addition, the biofuel cell comprises a bioanode comprising a carbon cloth coated with PQQ-dependent alcohol dehydrogenase immobilized in a cation-modified perfluoro sulfonic acid-PTFE copolymer. A schematic of the chemistry occurring at the biocathode and the bioanode are shown in FIG. 13. As described in Example 5, the biocathode and bioanode were placed in a beaker containing $NAD^+$ and ethanol and exposed to air to complete the biofuel cell.

| Anode Embodiments | Cathode Embodiments | Separation Embodiments |
|---|---|---|
| Standard Anode | Biocathode as described in I.A. | Salt Bridge or PEM |
| Bioanode as described in I.B. | Standard Cathode | Salt Bridge or PEM |

-continued

| Anode Embodiments | Cathode Embodiments | Separation Embodiments |
|---|---|---|
| Bioanode as described in I.B. | Biocathode as described in I.A. | Membraneless |

The above combinations of anode embodiments, cathode embodiments and separation embodiments are within the scope of the present invention.

III. Methods of Generating Electricity

In yet another embodiment, the invention is drawn to a method of generating electrical power, using the biocathode of the instant invention to reduce oxygen to water, in conjunction with a bioanode to oxidize an organic fuel to produce protons and electrons.

In still another embodiment, the invention includes a method of generating electricity using one or more of the biofuel cell embodiments described above comprising (a) oxidizing the fuel fluid at the anode and reducing the oxidant at the biocathode; (b) oxidizing the reduced form of the electron mediator during the reduction of the oxidant at the biocathode; (c) oxidizing the electrocatalyst; and (d) reducing the electrocatalyst at the electron conductor.

In another embodiment, the invention includes a method of generating electricity using one or more of the biofuel cell embodiments wherein the biocathode comprises an enzyme immobilization material comprising an electron mediator described above comprising (a) oxidizing the fuel fluid at the anode and reducing the oxidant at the biocathode; (b) oxidizing the reduced form of the electron mediator during the reduction of the oxidant at the biocathode; and (c) reducing the electron conductor.

In a further embodiment, the invention is directed to a method of generating electrical power comprising (a) oxidizing an organic fuel at an anode in the presence of at least one anode oxidoreductase enzyme, which is incorporated in the anode; (b) transferring electrons from an oxidized organic fuel to an anode electron conducting material by way of a redox polymer; (c) reducing an oxygen molecule at a cathode in the presence of an oxygen oxidoreductase enzyme, which is immobilized in a buffered compartment of a modified cathode ion exchange polymer membrane; and (d) transferring electrons from an electron conducting material to a substrate of the oxygen oxidoreductase by way of an electron transport mediator, which is immobilized in a buffered compartment of a modified ion exchange polymer membrane, such that an electric current is produced.

The biofuel cell of the invention is useful in a variety of pH environments, including physiological environments. The biofuel cell, which utilizes enzymes to catalyze oxidation/reduction ("redox") reactions instead of metal catalysts, was optimized to work at near neutral pH environments.

Definitions

As used herein, the term "redox polymer", "redox polymer film", or "redox polymer membrane" refers to a polymer capable of accepting or donating an electron from a compound, resulting in the oxidization or reduction, respectively, of the compound and the generation of a free electron available for transfer into an electric circuit.

As used herein, the term "quaternary ammonium" or "quaternary ammonium salt" refers to a compound comprising nitrogen covalently bound to four organic groups, as illustrated in eq. 2. N is nitrogen, $R_1$-$R_4$ are organic groups. Preferably, $R_1$, $R_2$, $R_3$ and $R_4$ are selected from the group consisting of propyl, butyl, pentyl or the like. Preferably, $R_1$, $R_2$, $R_3$ and $R_4$ are the same organic group. In an alternate embodiment, $R_1$, $R_2$, and $R_3$ are a methyl or an ethyl and $R_4$ is a hexyl, heptyl, octyl, nonyl, or decyl. In yet another alternate embodiment, a quaternary phosphonium salt may be used, wherein the salt may be a quaternary phosphonium, such that the N+ of Eq. 2 is replaced with a phosphorus ion. The counter ion to the quaternary ammonium (or phosphonium) ion may be any anion, such as for example a bromide ion (Br⁻).

Eq. 2:

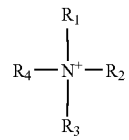

As used herein, a "fuel cell" comprises an anode and a cathode, which are separated to avoid an electrical short. Preferably, the anode and cathode are separated by a polymer electrolyte membrane. A biofuel cell utilizes a fuel fluid and an enzyme which catalyzes an oxidation of the fuel fluid. In one embodiment, a "biofuel cell" utilizes organic fuels as a source of energy and redox enzymes to catalyze the oxidation of the organic fuel. The terms "fuel cell" and "biofuel cell" are used interchangeably in throughout the instant disclosure. In one embodiment, the fuel cell of the instant invention may be used in applications that require an electrical supply, such as, but not limited to electronic devices and equipment, toys, internal medical devices, and electrically powered vehicles. In another embodiment, the fuel cell of the instant invention may be implanted into a living organism, wherein the organic fuel is derived from the organism and the fuel cell powers a device implanted in the living organism.

As used herein, the term "organic fuel" means any carbon-based compound that has stored energy. Organic fuels include but are not limited to nucleic acids, carbohydrates (such as glucose), alcohols, fatty acids and other hydrocarbons, ketones, aldehydes, amino acids and proteins. The organic fuel may be a biological compound within an organism. Preferred fuels are alcohols, which include methanol, ethanol, butanol, and isopropanol, and carbohydrates, especially glucose or polymers thereof. Preferred alcohols are ethanol and methanol.

As used herein, the term "bioanode" is an anode comprising an enzyme that catalyzes the oxidation of a fuel fluid. In one embodiment, the term "bioanode" means an anode, which comprises a redox enzyme that catalyzes the oxidation of an organic fuel. An anode provides a source of electrons for an electrical circuit or electrical potential. As used herein, the term "biocathode" means a cathode, which comprises a redox enzyme that catalyzes the reduction of an oxidant.

As used herein, the term "support membrane" refers to a rigid or semi-rigid inert material capable of conducting an electric current and used to support the polymer membranes of a biofuel cell electrode. Support membranes may comprise any conducting material, such as for example stainless steel, stainless steel mesh, carbon, carbon nanotubes, platinum or semiconducting material. A preferred support membrane is a sheet of carbon felt. The terms "carbon felt", "carbon cloth" and "carbon cloth support membrane" are used interchangeably.

As used herein, the term "ion exchange polymer" or "ion exchange polymer membrane" refers to a polymer capable of allowing for the conduction of ions through it. A preferred ion exchange polymer is a perfluorinated ion exchange polymer, such as Nafion® (DuPont, Wilmington, Del.). The invention is also drawn to a perfluorinated ion exchange polymer, which comprises a modification, which includes quaternary ammonium ions at the sulfonic acid exchange sites. The modification results in a neutral pH within the micelles of the ion exchange polymer. According to the present invention, one or more redox enzymes are incorporated or trapped within the micelles (or "micellar compartment") of the salt-extracted quaternary ammonium treated perfluorinated ion exchange polymer.

In one embodiment, the term "enzyme" or "redox enzyme" refers to a protein that functions as a catalyst in a chemical reaction.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

The "substituted hydrocarbyl" moieties described herein are hydrocarbyl moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, keto, acyl, acyloxy, nitro, amino, amido, nitro, cyano, thiol, ketals, acetals, esters and ethers.

Unless otherwise indicated, the alkyl groups described herein are preferably lower alkyl containing from one to eight carbon atoms in the principal chain and up to 20 carbon atoms. They may be straight or branched chain or cyclic and include methyl, ethyl, propyl, isopropyl, butyl, hexyl and the like.

Unless otherwise indicated, the alkenyl groups described herein are preferably lower alkenyl containing from two to eight carbon atoms in the principal chain and up to 20 carbon atoms. They may be straight or branched chain or cyclic and include ethenyl, propenyl, isopropenyl, butenyl, isobutenyl, hexenyl, and the like.

Unless otherwise indicated, the alkynyl groups described herein are preferably lower alkynyl containing from two to eight carbon atoms in the principal chain and up to 20 carbon atoms. They may be straight or branched chain and include ethynyl, propynyl, butynyl, isobutynyl, hexynyl, and the like.

The terms "aryl" or "ar" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

The terms "halogen" or "halo" as used herein alone or as part of another group refer to chlorine, bromine, fluorine, and iodine.

The term "acyl," as used herein alone or as part of another group, denotes the moiety formed by removal of the hydroxyl group from the group —COOH of an organic carboxylic acid, e.g., RC(O)—, wherein R is $R^1$, $R^1O$—, $R^1R^2N$—, or $R^1S$—, $R^1$ is hydrocarbyl, heterosubstituted hydrocarbyl, or heterocyclo, and $R^2$ is hydrogen, hydrocarbyl or substituted hydrocarbyl.

The term "acyloxy," as used herein alone or as part of another group, denotes an acyl group as described above bonded through an oxygen linkage (—O—), e.g., RC(O)O— wherein R is as defined in connection with the term "acyl."

The term "heteroatom" shall mean atoms other than carbon and hydrogen.

The terms "heterocyclo" or "heterocyclic" as used herein alone or as part of another group denote optionally substituted, fully saturated or unsaturated, monocyclic or bicyclic, aromatic or nonaromatic groups having at least one heteroatom in at least one ring, and preferably 5 or 6 atoms in each ring. The heterocyclo group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heterocyclo include heteroaromatics such as furyl, thienyl, pyridyl, oxazolyl, pyrrolyl, indolyl, quinolinyl, or isoquinolinyl and the like. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, thiol, ketals, acetals, esters and ethers.

The terms "hydroxyl protecting group" and "hydroxy protecting group" as used herein denote a group capable of protecting a free hydroxyl group ("protected hydroxyl") which, subsequent to the reaction for which protection is employed, may be removed without disturbing the remainder of the molecule. A variety of protecting groups for the hydroxyl group and the synthesis thereof may be found in "Protective Groups in Organic Synthesis" by T. W. Greene, John Wiley and Sons, 1981, or Fieser & Fieser. Exemplary hydroxyl protecting groups include methoxymethyl, 1-ethoxyethyl, benzyloxymethyl, (.beta.-trimethylsilylethoxy)methyl, tetrahydropyranyl, 2,2,2-trichloroethoxycarbonyl, t-butyl(diphenyl)silyl, trialkylsilyl, trichloromethoxycarbonyl and 2,2,2-trichloroethoxymethyl.

The following examples illustrate the invention.

EXAMPLES

Experimental Methods

The inventors have developed a dual property membrane useful as a biocathode for use in a fuel cell. By dual property, it is meant that the membrane serves as both a catalyst, comprising a cathode enzyme, and electron conducting membrane, comprising an electron transport mediator, such as $Ru(bpy)_3^{+2}$. The introduction of the electron transport mediator ("mediator") $Ru(bpy)_3^{+2}$ to quaternary ammonium bromide salt-treated Nafion®) membrane was performed according to several different methods, that is by mixture casting or ion exchange to incorporate an electron transport mediator, either before or after incorporation of a cathode enzyme (e.g., bilirubin oxidase). Three protocols for making the biocathode were investigated in this study. Regardless of the particular protocol used, it was shown that a concentration of $Ru(bpy)_3^{+2}$ of ~1.0-1.5 M in the membrane allows for the close proximity of the $Ru(bpy)_3^{+2}$ molecules within the pore structure of the modified Nafion membrane, which allows for self-exchange-based conduction of electrons between the enzyme and the electrode. This results in a biocathode with a single membrane that acts both to entrap and stabilize the cathode enzyme and acts as the redox polymer that shuttles electrons between the enzyme and the electrode.

Example 1

Preparation of Enzyme-Immobilized Salt-Extracted Membranes

Preparation of $Ru(bpy)_3^{+2}$/Nafion I $Ru(bpy)_3^{+2}$/Nafion I is made by the direct addition of $Ru(bpy)_3^{+2}$ salt to Nafion suspension (mixture casting).

To prepare the $Ru(bpy)_3^{+2}$/Nafion I Salt-Extracted Membrane ("Nafion I"), 0.15 millimols of $Ru(bpy)_3^{+2}$ were added to 4 ml of Nafion®), mixed well for ~3 to 4 hours by vortexing and using a sonicator in a constant temperature water bath. The mixture was then poured into a weighing boat to dry overnight. Once dry, the Ru(bpy)$_3^{+2}$/Nafion® mixture was salt extracted by soaking into deionized water using vortex, followed by centrifugation. The extracted solution went from orange to clear when all salt is extracted. The salt-extracted membrane was rinsed and dried, then redissolved in 4 ml of 80% Ethanol (can be redissolved in a mixture of lower aliphatic alcohols containing up to 30% water).

The cathode enzyme was immobilized in the Ru(bpy)$_3^{+2}$/Nafion I Salt-Extracted Membrane by the following procedure. Nafion® membranes incorporated with quaternary ammonium bromides were formed by co-casting the quaternary ammonium bromide with 5% by wt. Nafion® suspension (Solution Technologies, Inc.). The mixture-casting solutions were prepared by adding the quaternary ammonium bromides to the 5% by wt. suspension. All mixture-casting solutions were prepared so the concentration of quaternary ammonium bromides is in excess of the concentration of sulfonic acid sites in the Nafion® suspension. After optimization, it was determined that the most stable and reproducible membrane has a quaternary ammonium bromide concentration that is three times the concentration of the exchange sites.

One milliliter of the casting solution was placed in a weighing boat and allowed to dry. Previous studies had shown that all of the bromide ions that were introduced into a membrane were ejected from the membrane upon soaking that membrane in water. Therefore, 7.0 mL of 18 MΩ water were added to the weighing boats and allowed to soak overnight. The water was removed and the films were rinsed thoroughly with 18 MΩ water and dried. Then, the films were resuspended in 1.0 mL of methanol. Subsequently, approximately 1 mg of the electron mediator and approximately 0.5 to 1 mg of the cathode enzyme were added to 100 ml Ru(bpy)$_3^{+2}$/Nafion III Salt-Extracted Membrane (supra) and mixed well (in this case, vortexed for 20 minutes).

Preparation of Ru(bpy)$_3^{+2}$/Nafion II:

Ru(bpy)$_3^{+2}$/Nafion II is TBAB/Nafion film soaked in 1 mM Ru(bpy)$_3^{+2}$ solution before re-suspension and Bilirubin Oxidase immobilization.

To prepare Ru(bpy)$_3^{+2}$/Nafion II Salt-Extracted Membrane ("Nafion II"), 0.3 millimoles of tetrabutylamonium bromide (TBAB) (0.09672 g) were added to each 1 ml of Nafion®, then mixed by vortex for 10 minutes. The mixture was then poured into a weighing boat to dry overnight. (At this point, the membrane mixture was light yellow.) Once dry, the TBAB treated Nafion® was soaked in deionized water for 24 h, then rinsed three (3) times with deionized water and allowed to dry. (At this point, the membrane mixture was clear.) The dry salt-extracted layer was then soaked overnight in Ru(bpy)$_3^{+2}$ solution (1 mM Ru(bpy)$_3^{+2}$ dissolved in buffer, water or electrolyte), allowed to dry, then redissolved in 1 ml of ethanol. The cathode enzyme was immobilized in the modified membrane according to the protocol set forth above.

Preparation of Ru(bpy)$_3^{+2}$/Nafion III

Ru(bpy)$_3^{+2}$/Nafion III is TBAB/Nafion® membrane soaked in 1 mM Ru(bpy)$_3^{+2}$ after Bilirubin Oxidase immobilization and electrode fabrication.

To prepare Ru(bpy)$_3^{+2}$/Nafion III Salt-Extracted Membrane ("Nafion III"), 0.3 millimoles of tetrabutylamonium bromide (TBAB) (0.09672 g) were added to each 1 ml of Nafion®, then mixed by vortex for 10 minutes. The mixture was then poured into a weighing boat to dry overnight. (At this point, the membrane mixture was light yellow.) Once dry, the TBAB treated Nafion® was soaked in deionized water for 24 h, then rinsed three (3) times with deionized water and allowed to dry. (At this point, the membrane mixture was clear.) The dry salt-extracted layer was then redissolved in 1 ml of ethanol. The cathode enzyme was immobilized in the modified membrane according to the protocol set forth above. The TBAB-modified Nafion® containing immobilized bilirubin oxidase was cast to an electrode, allowed to dry and then soaked in Ru(bpy)$_3^{+2}$ solution (supra) for up to 48 hours; preferably, for 2 to 3 hours before testing.

Example 2

Preparation of Electrodes

Preparation of Ru(bpy)$_3^{+2}$/Nafion III on glassy carbon electrodes

To prepare the cathode enzyme/membrane casting solution, ~1 mg of Bilirubin and ~0.5-1 mg of Bilirubin Oxidase were added to 100 ml Ru(bpy)$_3^{+2}$/Nafion III Salt-Extracted Membrane (supra) and mixed well (in this case, vortexed for 20 minutes). 2 ml of the cathode enzyme/membrane casting solution was applied to polished glassy carbon electrodes (3 mm in diameter) and allowed to dry. Once dry, the cathode enzyme/membrane/carbon electrode was soaked for 3 h in a $N_2$-degassed Ru(bpy)$_3^{+2}$ solution. After the exchange of TBAB for Ru(bpy)$_3^{+2}$, the carbon electrodes were introduced into a $N_2$-degassed Phosphate buffer of pH 7.4 and allowed to soak for 1 h. After equilibration, the cathodes were tested by cyclic voltammetry at scan rates of 0.05 and 0.1 V/s. Then, the buffer solution was saturated with $O_2$ for 10 min and the cathodes were tested as above.

Preparation of Ru(bpy)$_3^{+2}$/Nafion III on 1 cm$^2$ Carbon Felt (Alfa Aesar)

To prepare the cathode enzyme/membrane casting solution, ~1 mg of Bilirubin and ~0.5-1 mg of Bilirubin Oxidase were added to 100 ml Ru(bpy)$_3^{+2}$/Nafion III Salt-Extracted Membrane (supra) and mixed well (in this case, vortexed for 20 minutes). 10 ml of the cathode enzyme/membrane casting solution was applied to each 1 square centimeter of carbon felt electrode and allowed to dry. Once dry, the cathode enzyme/membrane/carbon felt electrode was soaked in Ru(bpy)$_3^{+2}$ solution. After the exchange of TBAB for Ru(bpy)$_3^{+2}$, the carbon felt-based electrodes were introduced into. Phosphate buffer of pH 7.4 and allowed to soak for 1 hour in a "U" shaped cylindrical glass tubing containing phosphate buffer of pH 7.4. The anode side was dehydrogenase enzyme immobilized in TBAB/Nafion membrane immersed into a solution of 1 mM NAD$^+$ and 1.0 mM ethanol.

Experimental Results

Cyclic voltammetry was employed to characterize the each of the various prototype biocathodes made according to the "Nafion I" method, "Nafion II" method, or the "Nafion III" method (supra).

Representative voltammograms depicting the best, medium and worst current densities for each biocathode membrane preparation. See FIGS. 2 through 10, which depict those voltammograms. To summarize those results, the data indicated that the TBAB-Nafion/Ru(bpy)$_3^{+2}$ III membrane ("Nafion III") effectively immobilizes bilirubin oxidase enzyme without denaturing or de-activating the enzyme, and can produce current densities of at least 2.0 mA/cm$^2$ at the current catalyze loadings.

Example 3

Biofuel Cell

A prototype biofuel cell (FIG. 11) was built comprising a bioanode, which comprises an alcohol dehydrogenase immobilized in TBAB-modified Nafion® (as described in patent applications 60/429,829, 60/486,076 and Ser. No. 10/617, 452), and the instant Nafion III membrane comprising bilirubin oxidase, bilirubin and Ru(bpy)$_3^{+2}$ (see FIG. 1 for a depiction of the dual function biocathode membrane). Initial tests of this non-optimal biofuel cell, which has a PEM (Nafion® 117) membrane that separates the anode and cathode solutions and in which catalyst loading was only ~28% of the membranes depicted in the voltammogram experiments (supra), indicated that the open circuit potentials ranged from 0.4179-0.819 Volts and the maximum current density ranged from 0.224 mA/cm$^2$ to 2.23 mAmps/cm$^2$ and the maximum power was 0.951 mW/cm$^2$ (see FIG. 12, which depicts the power curve for this prototype).

Example 4

PQQ Dependent Anode

The modified Nafion® membranes were formed in a two step process. The first step was to cast a suspension of Nafion® with tetrabutylammonium bromide salt dissolved. The second step was to re-cast these initial membranes after the excess tetrabutylammonium bromide and HBr salts were extracted from the original membranes. Modified Nafion® membranes were incorporated with tetrabutylammonium bromide salt with 5% by wt. Nafion® suspension into a weighing boat. The mixture casting solution was prepared so the concentration of tetrabutylammonium bromide salt is in a three-fold excess of the concentration of sulfonic acid sites in the Nafion® suspension. Previous studies had shown all the bromide ions that were ejected from the membrane upon soaking that membrane in water. Therefore, 18 MΩ water was added to the weighing boats and allowed to soak overnight. This step was necessary to remove all excess HBr and quaternary ammonium salts. After the membranes soaked overnight, the water was removed and the films were rinsed with 18 MΩ water and dried. The films were then resuspended in ethanol. The suspended films were then employed in forming the enzyme/membrane casting solutions.

In order to obtain PQQ-dependent alcohol dehydrogenase (ADH), commercially purchased Gluconobacter sp. 33 was cultivated aerobically in GYC media at 30° C. for approximately 1 week. The centrifuged cell paste was twice washed with 0.9% NaCl and stored at −20° C. until use. The thawed cell paste was suspended in 0.2 M phosphate buffer pH 7.0 containing 1 mM CaCl$_2$ and disrupted by ultrasonic treatment for 1 min in an ice bath to prevent heating of the sample. Intact cells are removed by centrifugation for 20 min, and 10% solution of sodium deoxycholate was added (to a final concentration of 0.5%). The solution was incubated at 4° C. with gentle stirring for 1 hr followed by centrifugation for 1 hr to remove insoluble materials. Ten percent CaCl$_2$ solution was added to the clear supernatant to a 0.5% final concentration. The resultant calcium phosphate gel was collected by centrifugation and suspended in a 0.3 M potassium phosphate buffer pH 7.2 and stirred gently for 10-20 min. An insoluble material was discarded after centrifugation for 30 min. Solid ammonium sulfate was added to the supernatant and the precipitate formed was discarded after centrifugation. This step was repeated and the resultant supernatant was dissolved in 20 mM Tris-HCl buffer pH 7.2 containing 1 mM CaCl$_2$ and 1% sucrose and dialyzed overnight against the same buffer.

The dialyzed enzyme, after removing insoluble precipitate by centrifugation, was applied to the DEAE Toyo-pear 650 M column which was equilibrated with the dialysis buffer. The column was washed by passing two bed volumes of the same buffer and two bed volumes of 75 mM Tris-HCl buffer pH 7.2 containing 1% sucrose and 1 mM CaCl$_2$. PQQ-dependent ADH was eluted with the same buffer containing 0.2% of Triton X-100. Fractions with PQQ-dependent ADH activity were collected, concentrated, and the enzyme was precipitated with polyethylene glycol 6000. The precipitate was collected by centrifugation for 15 min and dissolved in 5 mM potassium phosphate buffer pH 7.2 containing 1 mM CaCl$_2$ and applied to CM-Sepharose column equilibrated with 5 mM potassium phosphate buffer pH 7.2 containing 1 mM CaCl$_2$ and 1% sucrose. Fractions containing PQQ-dependent ADH activity were collected and excess water was adsorbed with carboxymethyl cellulose, as per procedure in Reference 3.

Purified enzyme was immobilized in TBAB/Nafion® membrane in a 2:20 ratio of enzyme to 5% by wt. membrane suspension and coated on the surface of a glassy carbon electrode. A control electrode is also prepared by coating a glassy carbon electrode with 2 µL of TBAB/Nafion® casting solution then both electrodes are placed in a desiccator to dry for 15 min. The dry electrodes were allowed to equilibrate in a 1.0 mM PQQ/1.0 mM ethanol/pH 7.15 phosphate buffer solution for one hour. Cyclic voltammetry was used to investigate the electrochemistry of the bioanode.

Anode 1 prepared with PQQ-dependent ADH and a TBAB-modified Nafion® membrane gave the following performance. The lifetime of anode 1 was 152 days since fabrication. A maximum power of 2.47 mW/cm$^2$ and maximum current of 7.05 mA were obtained eight days after fabrication. A maximum open circuit potential of 1.08 V was obtained 100 days after fabrication. Another anode prepared with PQQ-dependent ADH and a triethylhexylammonium bromide-modified Nafion® membrane provided a maximum power of 3.01 mW/cm$^2$, a maximum current of 7.50 mA and an open circuit potential of 0.62 to 1.005 V. The lifetime of this anode was 35 days.

Example 5

Membraneless Biofuel Cell

Figure 11:
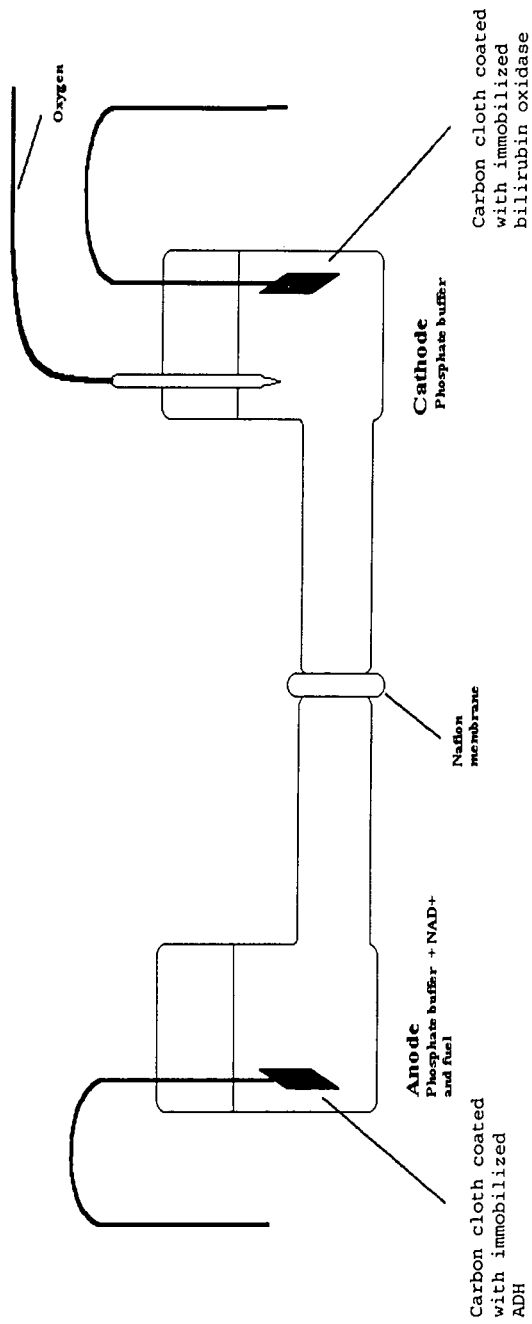
FIG. 11 is a schematic of a prototypical biofuel cell comprising a bioanode containing immobilized alcohol dehydrogenase and a polymethylene green redox membrane, a Nafion® PEM, and a biocathode containing immobilized bilirubin oxidase and $Ru(bpy)_3^{+2}$.
Figure 12:
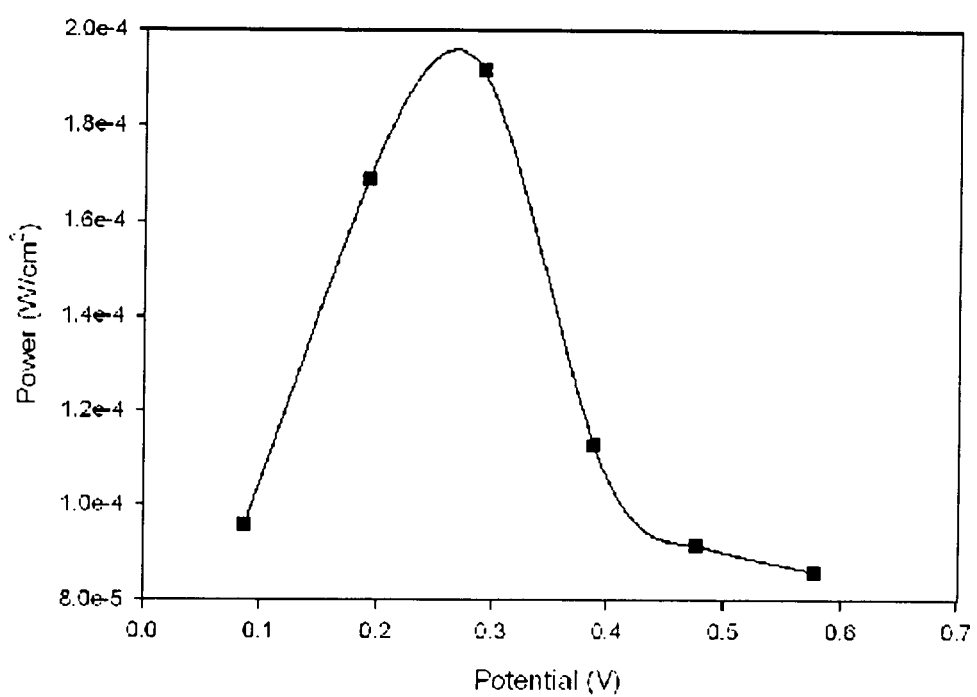
FIG. 12 is a power curve for the prototypical fuel cell of FIG. 11.

Preliminary experiments were conducted with a membraneless bioanode/biocathode cell, which includes everything depicted in the prototype biofuel cell of FIG. 11 (supra), except the PEM (Nafion 117) membrane that separates the cathode and anode solution was not employed, hence the term "membraneless"). The open circuit potentials of the prototype membraneless biofuel cell with an NAD-dependent bioanode ranged from 0.4063-0.7385 Volts, the maximum current density ranged from 0.288 mAmps/cm$^2$ to 5.38 mAmps/cm$^2$ and the maximum power was 0.46 mW/cm$^2$.

Tetrabutylammonium bromide (Sigma) was added to 5% by wt. Nafion suspension (1100 EW, Aldrich) and mixed by vortex for ~10 min. Tetrabutylammonium salt was added in a three-fold excess compared to the sulfonic acid groups on Nafion to ensure that all protons are exchanged with tetrabutylammonium cations. The mixture-casting solution was then cast in a weighing boat and allowed to dry overnight. Once dry, the mixture-cast film was soaked in 18 MΩ) water for 24 hr to remove all excess bromide salts. After the salt extraction, the films were thoroughly rinsed with 18 MΩ water three times and allowed to dry. The films were then resuspended in absolute ethanol to prepare them for enzyme immobilization.

One milligram of bilirubin (Sigma) and 0.5 mg of bilirubin oxidase (from Myrothecium verrucaria, unit activity=10 Units/mg, Sigma) were added to 100 ml of the tetrabutylammonium salt modified Nafion membrane suspension and vortexed for 20 minutes. Ten microliters of enzyme/membrane casting solution were pipetted onto 1 cm² of carbon fiber paper (Ballard Material Product, Inc.) and allowed to dry. Once dry, they were soaked overnight in 1.0 mM $Ru(bpy)_3^{+2}$ and 0.1 M $NaSO_4$ solution (for ion exchange of $Ru(bpy)_3^{+2}$ for TBA+). The electrodes were then rinsed with 18 MΩ water before use.

Immediately after the exchange of $Ru(bpy)_3^{+2}$ for $TBA^+$, the biocathode was assembled into a cell for data collection. Two types of cells were used. The traditional fuel cell was tested in a U-shaped glass cell where the anode and cathode compartment were separated by Nafion 117 PEM membrane (Alfa Aesar). The anode and the cathode compartments held approximately 50 mL of solution. The anode compartment was filled with a solution containing 1 mM ethanol in pH 7.15 buffer; optionally, if the enzyme used was NAD-dependent, 1 mM $^{NAD+}$ was also added to the anode compartment. The cathode compartment was filled with a solution containing the pH 7.15 buffer exposed to air. During the experiment, the only source of oxygen was from exposure of the solution to air. The completed biocathode along with a bioanode (fabricated as per procedure in U.S. application Ser. No. 10/617,452) were introduced into the compartment and tested. For the second type of fuel cell studied (the membraneless fuel cell), the biocathode and bioanode were introduced into a 50 mL beaker containing the fuel solution. The fuel solution consisted of 1.0 mM ethanol in phosphate buffer of pH 7.15 and optionally 1.0 mM $^{NAD+}$ if the enzyme used was NAD-dependent. The solution is allowed to equilibrate in air to ensure dissolved oxygen in the buffer before testing. The electrodes were positioned approximately 1 cm apart to ensure that they did not come into contact with each other.

All electrochemical measurements were preformed at room temperature, which varied from 20-25° C. The measurements were conducted on a CH Instruments potentiostat model 810 interfaced to a PC computer. The potentiostat was employed to measure open circuit potential and apply a varying load to the fuel cell, while measuring the current and maintaining a potential.

Figure 15:
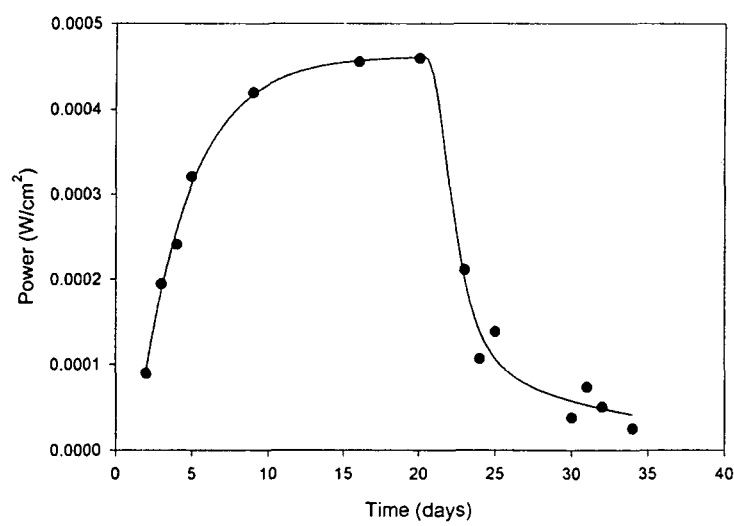
FIG. 15 is a graph representing the power output of a representative membraneless ethanol/oxygen biofuel cell with a NAD-dependent bioanode in a 1 mM ethanol and 1 mM $NAD^+$ solution in pH 7.15 phosphate buffer at room temperature as a function of time from fabrication.

The graph of the power output as a function of time of the membraneless ethanol/oxygen biofuel cell is shown in FIG. 15. Electrochemical data from various embodiments of biofuel cells are shown in the following table. Unless otherwise specified the biocathode in the following embodiments was prepared as described above in Example 2. Embodiment 1 was a biofuel cell with a NAD-dependent bioanode, a biocathode and a membrane separating the anode and cathode compartments. Embodiment 2 was a biofuel cell with a NAD-dependent bioanode, a biocathode and was membraneless. Embodiment 3 was a biofuel cell with a NAD-dependent bioanode, a biocathode and was membraneless with the electrochemical data collected at specified temperatures. Embodiment 4 was a biofuel cell with a PQQ-dependent bioanode, a biocathode and was membraneless. Embodiment 5 was a biofuel cell with a PQQ-dependent bioanode, a biocathode cast from 70 microliters of 1 mM enzyme solution mixed with 50 microliters of TBAB/Nafion and was membraneless. Embodiment 6 was a biofuel cell with a PQQ-dependent bioanode, a Fe(bpy) based biocathode and was membraneless. Embodiment 7 was a biofuel cell with a PQQ-dependent bioanode, a biocathode, beer as the fuel fluid and was membraneless. Embodiment 8 was a biofuel cell with a TBAB-modified Nafion® membrane with a PQQ-dependent ADH in the bioanode and a trimethylhexylammonium bromide-modified Nafion membrane in the biocathode. Embodiments 1-7 contained bioanodes and biocathodes with a TBAB-modified Nafion® membrane.

| Embodiment | Temperature (° C.) | Open Circuit Potential (V) | Current (A) | Power (W/cm²) |
|---|---|---|---|---|
| 1 | | 0.8190 | $2.23 \times 10^{-3}$ | $9.51 \times 10^{-4}$ |
| 2 | | 0.7385 | $5.38 \times 10^{-3}$ | $4.60 \times 10^{-4}$ |
| 3 | 37.5 | 0.5903 | $1.85 \times 10^{-3}$ | $5.26 \times 10^{-4}$ |
| 3 | 24.0 | 0.5660 | $1.00 \times 10^{-3}$ | $4.38 \times 10^{-4}$ |
| 3 | 6.0 | 0.6172 | $1.43 \times 10^{-3}$ | $5.57 \times 10^{-4}$ |
| 4 | | 1.0453 | $8.47 \times 10^{-3}$ | $1.41 \times 10^{-3}$ |
| 5 | | 0.7840 | $4.19 \times 10^{-3}$ | $4.82 \times 10^{-4}$ |
| 6 | | 0.1465 | $2.46 \times 10^{-4}$ | $1.71 \times 10^{-5}$ |
| 7 | | 0.7200 | $1.19 \times 10^{-3}$ | $1.44 \times 10^{-4}$ |
| 8 | | 1.0613 | $1.66 \times 10^{-3}$ | $1.32 \times 10^{-3}$ |

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims, which follow the examples.

What is claimed is:

1. A biocathode comprising:
   (a) an electron conductor;
   (b) an electron mediator;
   (c) at least one enzyme capable of reacting with a reduced form of the electron mediator and an oxidant to produce an oxidized form of the electron mediator and water; and
   (d) an electron conducting enzyme immobilization material comprising an electrocatalyst, the enzyme immobilization material immobilizing and stabilizing the enzyme, the material being permeable to the oxidant, an oxidized form of the electrocatalyst being capable of gaining electrons from the electron conductor to produce a reduced form of the electrocatalyst that is capable of reacting with an oxidized form of the electron mediator to produce a reduced form of the electron mediator and an oxidized form of the electrocatalyst;
   wherein the enzyme is entrapped within pores of the enzyme immobilization material and the enzyme immobilization material comprises an ion exchange polymer comprising a hydrophobic cation.

2. A biocathode comprising:
   (a) an electron conductor;
   (b) an electron mediator;
   (c) at least one enzyme capable of reacting with a reduced form of the electron mediator and an oxidant to produce an oxidized form of the electron mediator and water; and
   (d) an electron conducting enzyme immobilization material comprising the electron mediator, the enzyme immobilization material immobilizing and stabilizing the enzyme, the material being permeable to the oxidant, an oxidized form of the electron mediator being capable of gaining electrons from the electron conductor to produce a reduced form of the electron mediator;
   wherein the enzyme is entrapped within pores of the enzyme immobilization material and the enzyme immobilization material comprises an ion exchange polymer comprising a hydrophobic cation.

3. A biocathode comprising:
(a) an electron conductor;
(b) an electron mediator;
(c) at least one enzyme capable of reacting with a reduced form of the electron mediator and an oxidant to produce an oxidized form of the electron mediator and water; and
(d) an electron conducting enzyme immobilization material comprising the electron mediator and an electrocatalyst, the enzyme immobilization material immobilizing and stabilizing the enzyme, the material being permeable to the oxidant, an oxidized form of the electrocatalyst being capable of gaining electrons from the electron conductor to produce a reduced form of the electrocatalyst that is capable of reacting with an oxidized form of the electron mediator to produce a reduced form of the electron mediator and an oxidized form of the electrocatalyst;
wherein the enzyme is entrapped within pores of the enzyme immobilization material and the enzyme immobilization material comprises an ion exchange polymer comprising a hydrophobic cation.

4. A biocathode comprising:
(a) an electron conductor;
(b) an electron mediator;
(c) at least one enzyme capable of reacting with a reduced form of the electron mediator and an oxidant to produce an oxidized form of the electron mediator and water; and
(d) an electron conducting enzyme immobilization material comprising the electron mediator, the enzyme immobilization material immobilizing and stabilizing the enzyme, the material being permeable to the oxidant, an oxidized form of an electrocatalyst being capable of gaining electrons from the electron conductor to produce a reduced form of the electrocatalyst that is capable of reacting with an oxidized form of the electron mediator to produce a reduced form of the electron mediator and an oxidized form of the electrocatalyst;
wherein the enzyme is entrapped within pores of the enzyme immobilization material and the enzyme immobilization material comprises an ion exchange polymer comprising a hydrophobic cation.

5. A biofuel cell for generating electricity comprising:
a fuel fluid;
an electron mediator;
an anode capable of a reaction to oxidize the fuel fluid; and
a biocathode of claim 1.

6. A biofuel cell for generating electricity comprising:
a fuel fluid;
an anode capable of a reaction to oxidize the fuel fluid; and
a biocathode of claim 2.

7. A biofuel cell for generating electricity comprising:
a fuel fluid;
an anode capable of a reaction to oxidize the fuel fluid; and
a biocathode of claim 3.

8. A biofuel cell for generating electricity comprising:
a fuel fluid;
an anode capable of a reaction to oxidize the fuel fluid; and
a biocathode of claim 4.

9. The biocathode of claim 2 wherein the enzyme immobilization material comprises a perfluoro sulfonic acid-PTFE copolymer modified with a hydrophobic cation larger than $NH_4^+$ wherein the hydrophobic cation exchanges for protons as the counterion to the $—SO_3^-$ groups of the perfluoro sulfonic acid-PTFE copolymer.

10. The biocathode of claim 2 wherein the electron conductor comprises a carbon-based material, a metallic conductor, a semiconductor, a metal oxide or a modified conductor.

11. The biocathode of claim 2 wherein the electron conductor comprises a carbon-based material.

12. The biocathode of claim 2 wherein the electron conductor comprises carbon cloth, carbon paper, carbon screen printed electrodes, carbon black, carbon powder, carbon fiber, single-walled carbon nanotubes, double-walled carbon nanotubes, multi-walled carbon nanotubes, carbon nanotube arrays, diamond-coated conductors, glass carbon, mesoporous carbon, graphite, uncompressed graphite worms, delaminated purified flake graphite, high performance graphite, highly ordered pyrolytic graphite, pyrolytic graphite or polycrystalline graphite.

13. The biocathode of claim 9 wherein the hydrophobic cation comprises an ammonium-based cation, quaternary ammonium cation, alkyltrimethylammonium cation, organic cation, phosphonium cation, triphenylphosphonium, pyridinium cation, imidazolium cation, hexdecylpyridinium, ethidium, viologen, methyl viologen, benzyl viologen, bis (triphenylphosphine)iminium metal complex, bipyridyl metal complex, phenanthroline-based metal complex, [Ru(bipyridine)$_3$]$^{2+}$ or [Fe(phenanthroline)$_3$]$^{3+}$.

14. The biocathode of claim 9 wherein the hydrophobic cation comprises a quaternary ammonium cation represented by formula 1

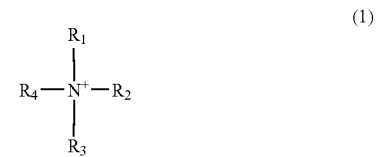

wherein $R_1$, $R_2$, $R_3$ and $R_4$ are independently hydrogen, hydrocarbyl, substituted hydrocarbyl or heterocyclo wherein at least one of $R_1$, $R_2$, $R_3$ and $R_4$ is other than hydrogen.

15. The biocathode of claim 14 wherein $R_1$, $R_2$, $R_3$ and $R_4$ are independently hydrogen, methyl, ethyl, propyl, butyl, pentyl, hexyl, heptyl, octyl, nonyl, decyl, undecyl, dodecyl, tridecyl or tetradecyl wherein at least one of $R_1$, $R_2$, $R_3$ and $R_4$ is other than hydrogen.

16. The biocathode of claim 14 wherein $R_1$, $R_2$, $R_3$ and $R_4$ are the same and are methyl, ethyl, propyl, butyl, pentyl or hexyl.

17. The biocathode of claim 9 wherein the modified perfluoro sulfonic acid-PTFE copolymer is modified with tetrabutylammonium halide, triethylhexylammonium halide or trimethyldodecylammonium halide.

18. The biocathode of claim 9 wherein the modified perfluoro sulfonic acid-PTFE copolymer is modified with tetrabutylammonium halide or triethylhexylammonium halide.

19. The biocathode of claim 9 wherein the modified perfluoro sulfonic acid-PTFE copolymer is modified with triethylhexylammonium halide.

20. The biocathode of claim 2 wherein the enzyme comprises an oxidoreductase.

21. The biocathode of claim 2 wherein the enzyme comprises a glucose oxidase, alcohol-based oxidase or cholesterol-based oxidase.

22. The biocathode of claim 2 wherein the enzyme comprises laccase, cytochrome C oxidase, bilirubin oxidase or peroxidase.

23. The biocathode of claim 2 wherein the enzyme comprises an oxygen oxidoreductase having an optimum activity at a pH between about 6.5 and about 7.5.

24. The biocathode of claim 2 wherein the enzyme comprises bilirubin oxidase.

25. The biocathode of claim 2 wherein the electron mediator comprises a metalloprotein, a conjugated organic compound, a sugar, a sterol, a fatty acid or a coenzyme or substrate of an oxidase.

26. The biocathode of claim 2 wherein the oxidized form of the electron mediator comprises stellacyanin, bilirubin, glucose or cholesterol.

27. The biocathode of claim 2 wherein the oxidized form of the electron mediator comprises bilirubin.

28. The biocathode of claim 1 wherein the electrocatalyst for the electron mediator comprises organometallic cations with standard reduction potentials greater than +0.4 volts.

29. The biocathode of claim 1 wherein the electrocatalyst for the electron mediator comprises osmium, ruthenium, iron, nickel, rhodium, rhenium, or cobalt complexes.

30. The biocathode of claim 1 wherein the reduced form of the electrocatalyst for the electron mediator comprises $Ru(phen)_3^{+2}$, $Fe(phen)_3^{+2}$, $Ru(bpy)_3^{+2}$, $Os(bpy)_3^{+2}$ or $Os(terpy)_3^{+2}$.

31. The biocathode of claim 1 wherein the reduced form of the electrocatalyst for the electron mediator comprises $Ru(bpy)_3^{+2}$.

32. The biocathode of claim 1 wherein the concentration of the electrocatalyst is from about 100 mM to about 3M.

33. The biocathode of claim 1 wherein the concentration of the electrocatalyst is from about 250 mM to about 2.25M.

34. The biocathode of claim 1 wherein the concentration of the electrocatalyst is from about 500 mM to about 2M.

35. The biocathode of claim 1 wherein the concentration of the electrocatalyst is from about 1M to about 1.5M.

36. The biofuel cell of claim 6 wherein the oxidant comprises oxygen or peroxide.

37. The biofuel cell of claim 6 wherein the oxidant comprises oxygen.

38. The biofuel cell of claim 6 wherein the fuel fluid comprises ammonia, methanol, ethanol, propanol, isobutanol, butanol and isopropanol, allyl alcohols, aryl alcohols, glycerol, propanediol, mannitol, glucuronate, aldehyde, carbohydrates, glucose, glucose-1, D-glucose, L-glucose, glucose-6-phosphate, lactate, lactate-6-phosphate, D-lactate, L-lactate, fructose, galactose-1, galactose, aldose, sorbose, mannose, glycerate, coenzyme A, acetyl Co-A, malate, isocitrate, formaldehyde, acetaldehyde, acetate, citrate, L-gluconate, beta-hydroxysteroid, alpha-hydroxysteroid, lactaldehyde, testosterone, gluconate, fatty acids, lipids, phosphoglycerate, retinal, estradiol, cyclopentanol, hexadecanol, long-chain alcohols, coniferyl-alcohol, cinnamyl-alcohol, formate, long-chain aldehydes, pyruvate, butanal, acyl-CoA, steroids, amino acids, flavin, NADH, $NADH_2$, NADPH, $NADPH_2$ or hydrogen.

39. The biofuel cell of claim 6 wherein the fuel fluid comprises methanol, ethanol or propanol.

40. The biofuel cell of claim 6 wherein the fuel fluid comprises ethanol.

41. The biofuel cell of claim 6 wherein the anode is a bioanode.

42. The biofuel cell of claim 41 wherein the bioanode comprises a modified perfluoro sulfonic acid-PTFE copolymer.

43. The biofuel cell of claim 42 wherein the modified perfluoro sulfonic acid-PTFE copolymer is modified with tetrabutylammonium halide, triethylhexylammonium halide or trimethyldodecylammonium halide.

44. The biofuel cell of claim 42 wherein the modified perfluoro sulfonic acid-PTFE copolymer is modified with triethylhexylammonium halide.

45. The biofuel cell of claim 41 wherein the bioanode comprises a PQQ-dependent alcohol dehydrogenase which has a PQQ molecule electrostatically associated with it.

46. The biofuel cell of claim 45 wherein the bioanode and biocathode are not separated by a salt bridge or a polymer electrolyte membrane.

47. A method of generating electricity using the biofuel cell of claim 5 comprising
    (a) oxidizing the fuel fluid at the anode and reducing the oxidant at the biocathode;
    (b) oxidizing the reduced form of the electron mediator during the reduction of the oxidant at the biocathode;
    (c) oxidizing the electrocatalyst; and
    (d) reducing the electrocatalyst at the electron conductor.

48. A method of generating electricity using the biofuel cell of claim 6 comprising
    (a) oxidizing the fuel fluid at the anode and reducing the oxidant at the biocathode;
    (b) oxidizing the reduced form of the electron mediator during the reduction of the oxidant at the biocathode; and
    (c) reducing the electron mediator at the electron conductor.

49. The method of claim 47 wherein the oxidant is oxygen or a peroxide.

50. The method of claim 47 wherein the oxidant is oxygen.

51. The method of claim 47 wherein the fuel fluid comprises ammonia, methanol, ethanol, propanol, isobutanol, butanol and isopropanol, allyl alcohols, aryl alcohols, glycerol, propanediol, mannitol, glucuronate, aldehyde, carbohydrates, glucose, glucose-1, D-glucose, L-glucose, glucose-6-phosphate, lactate, lactate-6-phosphate, D-lactate, L-lactate, fructose, galactose-1, galactose, aldose, sorbose, mannose, glycerate, coenzyme A, acetyl Co-A, malate, isocitrate, formaldehyde, acetaldehyde, acetate, citrate, L-gluconate, beta-hydroxysteroid, alpha-hydroxysteroid, lactaldehyde, testosterone, gluconate, fatty acids, lipids, phosphoglycerate, retinal, estradiol, cyclopentanol, hexadecanol, long-chain alcohols, coniferyl-alcohol, cinnamyl-alcohol, formate, long-chain aldehydes, pyruvate, butanal, acyl-CoA, steroids, amino acids, flavin, NADH, $NADH_2$, NADPH, $NADPH_2$ or hydrogen.

52. The method of claim 47 wherein the fuel fluid comprises methanol, ethanol or propanol.

53. The method of claim 47 wherein the fuel fluid comprises ethanol.

54. The method of claim 47 wherein the enzyme comprises an oxidoreductase.

55. The method of claim 47 wherein the enzyme comprises a glucose oxidase, alcohol-based oxidase or cholesterol-based oxidase.

56. The method of claim 47 wherein the enzyme comprises laccase, cytochrome c oxidase, bilirubin oxidase or peroxidase.

57. The method of claim 47 wherein the enzyme comprises bilirubin oxidase.

58. The method of claim 47 wherein the electron mediator comprises a metalloprotein, a conjugated organic compound, a sugar, a sterol, a fatty acid or a coenzyme or substrate of an oxidase.

59. The method of claim 47 wherein the electron mediator comprises stellacyanin, bilirubin, glucose or cholesterol.

60. The method of claim 47 wherein the oxidized form of the electron mediator comprises bilirubin.

61. The method of claim 47 wherein the electrocatalyst for the electron mediator comprises organometallic cations with standard reduction potentials greater than +0.4 volts.

62. The method of claim 47 wherein the electrocatalyst for the electron mediator comprises osmium, ruthenium, iron, nickel, rhodium, rhenium, or cobalt complexes.

63. The method of claim 47 wherein the reduced form of the electrocatalyst for the electron mediator comprises $Ru(phen)_3^{+2}$, $Fe(phen)_3^{+2}$, $Ru(bpy)_3^{+2}$, $Os(bpy)_3^{+2}$ or $Os(terpy)_3^{+2}$.

64. The method of claim 47 wherein the reduced form of the electrocatalyst for the electron mediator comprises $Ru(bpy)_3^{+2}$.

\* \* \* \* \*